US012234753B2

(12) United States Patent
Cecil

(10) Patent No.: US 12,234,753 B2
(45) Date of Patent: Feb. 25, 2025

(54) TAPPET ASSEMBLY FOR VALVE LIFT PROFILE MODIFICATION

(71) Applicant: Cummins Inc., Columbus, IN (US)

(72) Inventor: Adam C. Cecil, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/311,607

(22) Filed: May 3, 2023

(65) Prior Publication Data

US 2023/0272726 A1 Aug. 31, 2023

Related U.S. Application Data

(63) Continuation of application No. PCT/US2021/071759, filed on Oct. 7, 2021.

(60) Provisional application No. 63/111,702, filed on Nov. 10, 2020.

(51) Int. Cl.

| | |
|---|---|
| ***F01L 1/14*** | (2006.01) |
| ***F01L 1/047*** | (2006.01) |
| ***F01L 1/18*** | (2006.01) |
| ***F01L 1/26*** | (2006.01) |
| ***F01L 13/00*** | (2006.01) |
| ***F02D 13/06*** | (2006.01) |

(52) U.S. Cl.

CPC ............... *F01L 1/146* (2013.01); *F01L 1/182* (2013.01); *F01L 1/267* (2013.01); *F01L 13/0031* (2013.01); *F02D 13/06* (2013.01); *F01L 1/047* (2013.01); *F01L 2013/001* (2013.01)

(58) Field of Classification Search

CPC ..... F01L 1/14–146; F01L 1/047; F01L 1/267; F01L 1/182; F01L 13/0031

See application file for complete search history.

(56) References Cited

U.S. PATENT DOCUMENTS

| | | | | |
|---|---|---|---|---|
| 7,849,826 | B2 | 12/2010 | Cho | |
| 8,161,929 | B2 | 4/2012 | Kuhl et al. | |
| 2001/0013325 | A1 | 8/2001 | Buglioni | |
| 2002/0017252 | A1 | 2/2002 | Onoue | |
| 2014/0283772 | A1 * | 9/2014 | Meldolesi | F01L 3/22 123/90.15 |

FOREIGN PATENT DOCUMENTS

| | | | |
|---|---|---|---|
| BR | 102019015786 | A2 * | 2/2021 |
| CN | 103147814 | A | 6/2013 |

(Continued)

OTHER PUBLICATIONS

English translation of EP 1493902 A1 obtained Apr. 26, 2024.*

"International Search Report and Written Opinion", PCT Appln. No. PCT/US21/71759, Feb. 14, 2022, 14 pgs.

*Primary Examiner* — Ngoc T Nguyen

(74) *Attorney, Agent, or Firm* — Taft, Stettinius & Hollister LLP

(57) ABSTRACT

A valve train assembly is provided for modifying a lift of at least one intake valve and/or exhaust valve. The valve train assembly includes at least one tappet that is housed in a rocker housing with at least one rocker lever. The at least one tappet is engaged to an actuator that is operable to change the tappet from a first configuration in which all cam lobe motion is imparted to the rocker lever for opening and closing the intake and/or exhaust valve, to a second configuration in which less than all motion of the cam lobe is transferred to the rocker lever.

19 Claims, 19 Drawing Sheets

(56) References Cited

FOREIGN PATENT DOCUMENTS

| | | | |
|---|---|---|---|
| CN | 103470324 | A | 12/2013 |
| EP | 0037269 | A1 | 7/1981 |
| EP | 1493902 | A1 | 1/2005 |
| EP | 1510663 | A1 | 3/2005 |
| WO | 2007057290 | A1 | 5/2007 |

* cited by examiner

TAPPET ASSEMBLY FOR VALVE LIFT PROFILE MODIFICATION

CROSS-REFERENCE TO RELATED APPLICATION

This application is a continuation of International PCT Application No. PCT/US2021/71759 filed on Oct. 7, 2021, which claims priority U.S. Provisional Application Ser. No. 63/111,702 filed on Nov. 10, 2020, each of which is incorporated herein by reference in its entirety for all purposes.

TECHNICAL FIELD

This disclosure relates to tappet assemblies to allow modification of the lift profile for the intake and/or exhaust valves for one or more cylinders of an internal combustion engine.

BACKGROUND

Cylinder deactivation has been employed in various engines for many years to reduce the pumping work of the engine for improved fuel economy. One type of cylinder deactivation tappet assembly known in the art is shown in FIG. 1. In FIG. 1, a roller 6 spins about an axle 1 while following the camshaft lobe (not shown). The roller axle 1 is captured in the outer body 2. An inner body 5 is located within the outer body 2. A lost motion spring 3 is captured between the outer body 2 and the inner body 5. A locking pin 4 connects the inner body 5 to the outer body 2 when extended as shown. A push tube (not shown) engages with the push tube socket 8 located within the inner body 5. Oil enters the oil hole passage 7 when directed by a hydraulic control valve (not shown) to disengage the locking pin(s) 4. When the locking pin 4 is disengaged from the outer body 2, the cam lobe motion is absorbed by the lost motion spring 3 and no motion is transferred to the push tube, allowing the intake or exhaust valve to remain closed. This state of operation is known as "deactivation". When oil pressure is no longer supplied to the oil hole passage 7, the locking pin 4 will engage the outer body 2 and once again tie the motion of the outer body 2 and inner body 5 together so that the camshaft lift event is transferred to the push tube to open the corresponding intake or exhaust valve.

The means by which the locking pin(s) 4 are engaged or disengaged is modulated via the pressure in a hydraulic circuit that uses engine oil as a working fluid. Typically, the locking pins 4 are engaged, and only disengage when pressure in the dedicated locking pin gallery is raised to the rifle pressure of the engine. This strategy enables a mechanical failsafe when no oil pressure is available to allow for engine starting. The drawback of the hydraulic system is that cylinder deactivation can only be engaged when adequate oil pressure exists to move the spring-loaded locking pin 4 for disengagement. This becomes particularly challenging at low engine operating speeds, or if other elements of the lube circuit have high oil demands such as piston cooling nozzles, camshaft phasers, and engine brakes. The oil pump size may also need to be increased to cope with higher lube circuit demand. Using engine oil also limits potential usage during cold conditions due to high oil viscosity and the components themselves are subject to oil cleanliness concerns with could interfere with tight clearances of the moving parts. Therefore, further improvements in this technological area are desired.

SUMMARY

Systems, apparatus, and methods are disclosed herein relating to modification of lift profiles of intake and/or exhaust valves for internal combustion engines, such as for cylinder deactivation, shorter duration valve lift events as compared to nominal valve lift durations, and/or multiple levels of valve lift. In one embodiment, a mechanical switching mechanism is used to select between a nominal mode of operation for the valve lift and a modified valve lift mode of operation. As a result, the lubrication circuit of the engine does not have to be employed or upgraded (for existing engines), since no additional demand is put on the lubrication circuit. The cylinders can also be operated in a cylinder deactivation mode or modified lift modes under operating conditions not permitted by hydraulic actuation, such as during cold start up conditions, low speed operations, or low oil pressure conditions. The intricate drillings and passageways for a hydraulic circuit, which can be costly and difficult to manufacture, are likewise not needed. However, the present disclosure can also be employed with hydraulic systems to operate the switching mechanism. The mechanical switching mechanism can also have an internal feedback device to ensure that a cylinder deactivation event occurred when commanded, to simplify onboard diagnostic controls.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DETAILED DESCRIPTION

Figure 1:
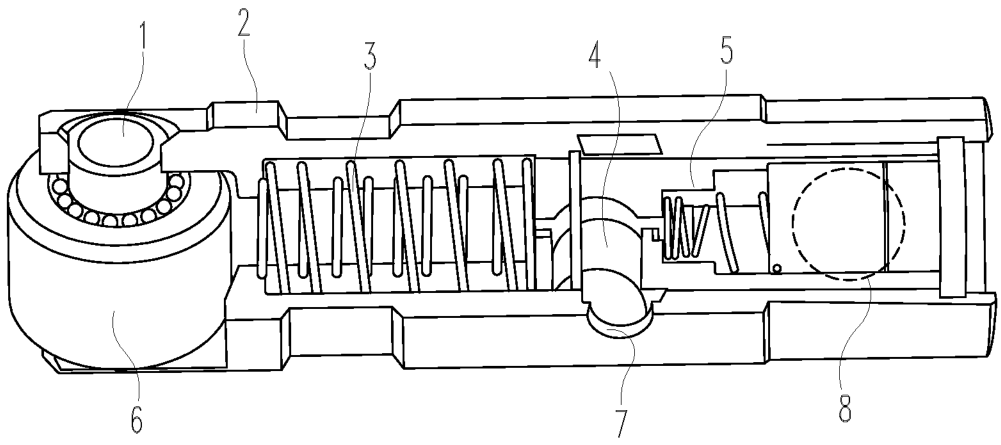
Fig. 1 (Prior Art)
FIG. 1 is a perspective view in partial section of a prior art cylinder deactivation tappet for an internal combustion engine.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 2:
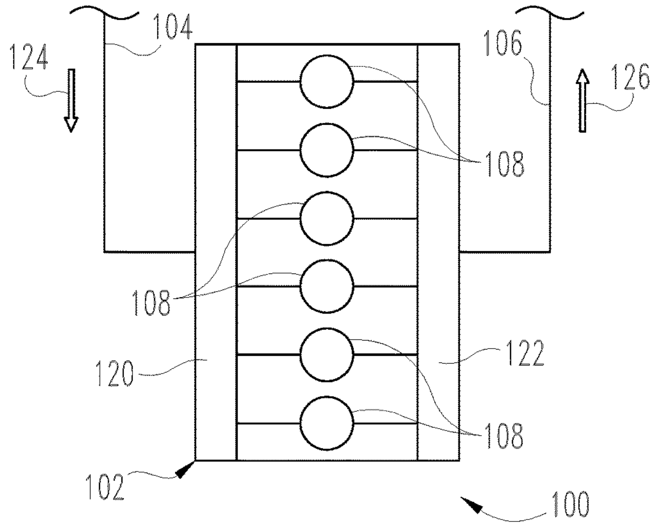
FIG. 2 is a schematic view of an internal combustion engine system.

FIG. 2 shows an internal combustion engine system 100 according to one embodiment of the present application. System 100 includes an internal combustion engine 102 having an intake system 104 and an exhaust system 106. Engine 102 can be any type of engine, and in one specific embodiment is a diesel engine that includes a number of cylinders 108 each housing a piston. Cylinders 108 receive an intake flow 124 and combust a fuel provided thereto to produce an exhaust flow 126 from each of the cylinders. In the illustrated embodiment, engine 102 includes six cylinders connected with an intake manifold 120 and an exhaust manifold 122. Engine 102 can be an in-line type engine with a single cylinder bank, although other embodiments include V-shaped cylinder arrangements, a W-type engine, or any engine arrangement with one or more cylinders. It is contemplated that engine 102 is provided as part of a powertrain for a vehicle (not shown).

Figure 3:
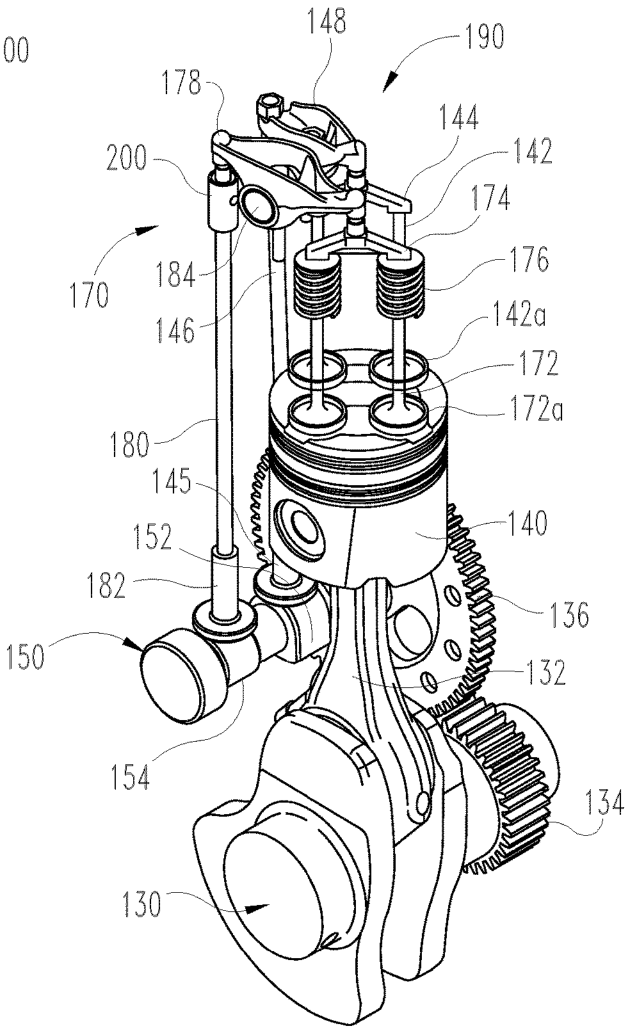
FIG. 3 is an isometric view of a portion of the internal combustion engine of FIG. 2 including a valve lift system

Referring to FIG. 3, there is illustrated one embodiment of a valve lift system for one cylinder of engine 102. Engine 102 includes crankshaft 130, a piston 140, a camshaft 150, and a valve opening mechanism 190 that includes a valve lift system 170. Piston 140 is housed in a respective one of the cylinders 108, and is rotatably connected to crankshaft 130 with a connecting rod 132 so that reciprocating movement of piston 140 rotates crankshaft 130, as known in the art. Crankshaft 130 also includes a first, crankshaft gear 134, and first gear 134 is connected to a second, camshaft gear 136 that is connected to camshaft 150. Rotation of crankshaft 130 rotates camshaft 150 at, for example, half speed of crankshaft 130 with gears 134, 136 providing a gear reduction, as known in the art. Other embodiments contemplate other types of connections between crankshaft 130 and camshaft 150, such as a chain or belt drive, and/or other drive ratios.

Each cylinder 108 of engine 102 houses one piston 140 that is connected to crankshaft 130 and camshaft 150. Each cylinder 108 also includes at least one intake valve 142 that is opened and closed by valve opening mechanism 190 connected to an intake cam lobe 152 of camshaft 150. The opening of the intake valve(s) 142 allows a charge flow to be admitted into the combustion chamber of the respective cylinder 108 through an intake opening 142*a*. In the illustrated embodiment, the intake valve 142 includes first and second intake valves connected by an intake cross head 144. Intake cross head 144 is connected to an intake rocker 148, which is rotatable about a rocker axis in response to an intake valve opening lobe of intake cam lobe 152 pushing on the intake push tube 146 as the intake valve opening lobe of intake cam lobe 152 passes against intake cam follower 145 at the end of push tube 146.

Each cylinder 108 further includes at least one exhaust valve 172. Opening of the at least one exhaust valve 172 with valve opening mechanism 190 allows exhaust gases created by combustion of the charge flow to escape the combustion chamber of the respective cylinder 108 through an exhaust opening 172*a*. In the illustrated embodiment, the exhaust valve 172 includes first and second exhaust valves connected by an exhaust cross head 174. Each exhaust valve(s) 172 further includes a valve spring(s) 176 actuated by an exhaust rocker 178 through exhaust cross head 174 to open and close the exhaust valve(s) 172 in response to an exhaust valve opening lobe on exhaust cam lobe 154 acting on exhaust push tube 180.

In the illustrated embodiment, an exhaust push rod 180 extends through a bore in a block of engine 102, and is engaged to exhaust cam lobe 154 with a cam follower 182. Cam follower 182 is engaged to an end of an exhaust push tube 180. Exhaust push tube 180 translates in response to rotation of exhaust cam lobe 154 acting on cam follower 182 and acts through tappet 200 to pivot exhaust rocker 178 about a rocker shaft 184. A similar arrangement is provided for intake push tube 146.

Valve lift system 170 further includes each valve opening mechanism 190 employing a valve lift tappet 200*a*, 200*b* on each of the push tubes 146, 180. Each tappet 200*a*, 200*b* is operable to provide for variable lift of the intake and/or exhaust valves 142, 172 when a lift profile that varies from a standard or nominal lift profile is desired, such as during cylinder deactivation or Miller cycling, as discussed further below.

Figure 4:
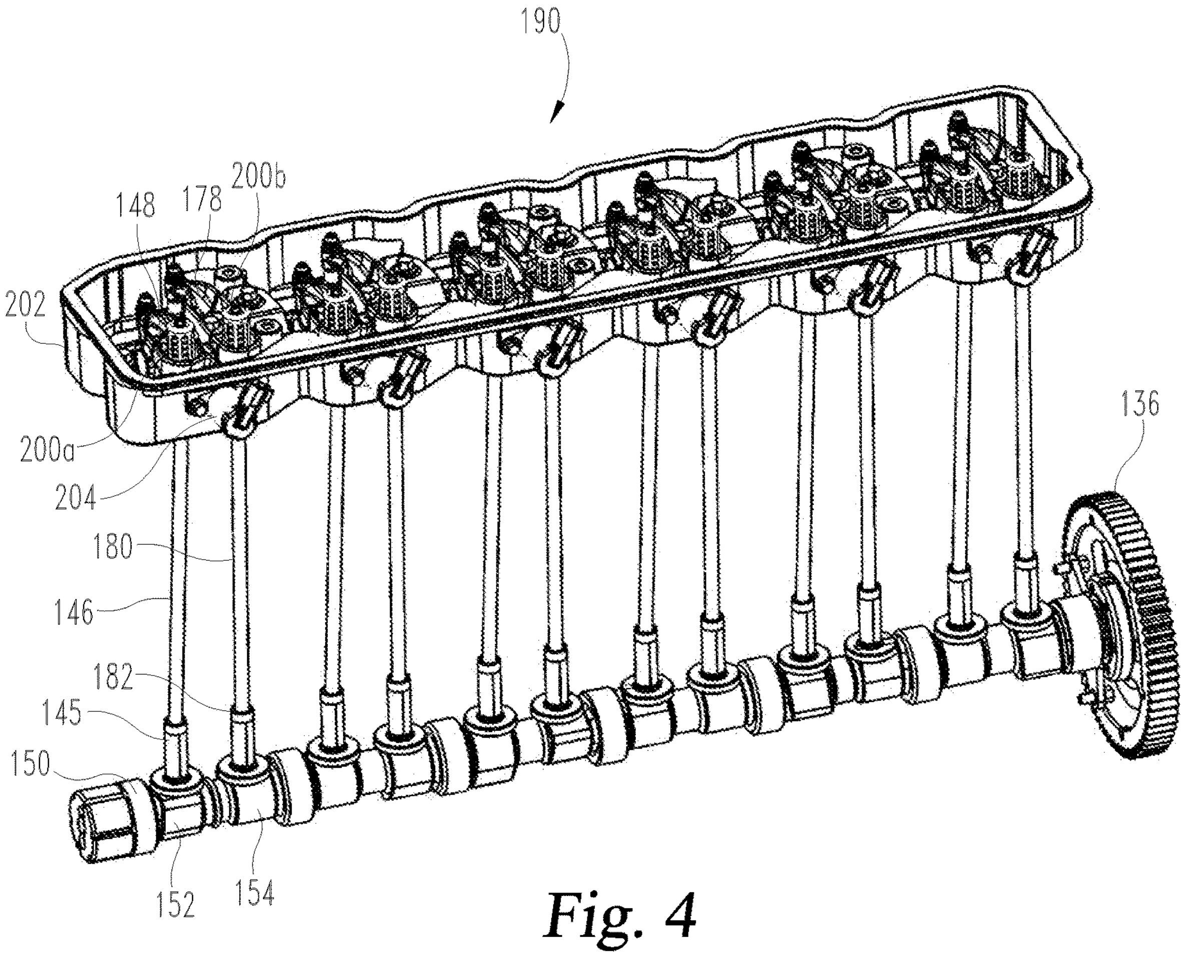
FIG. 4 is an isometric view of one embodiment valve lift system for the internal combustion engine.

Referring to FIG. 4, there is an embodiment of valve lift system 170. As discussed above, camshaft gear 136 is driven by crankshaft gear 134 at a drive ratio. The camshaft gear 136 rotates camshaft 150 that contains both intake cam lobes 152 and exhaust cam lobes 154. The intake follower 145 follows the lobe profile of the intake cam lobe 152. The exhaust follower 182 follows the lobe profile of the exhaust cam lobe 154. The intake push tube 146 transfers the motion of the intake follower 145 to the cylinder deactivation tappet 200*a*. An exhaust push tube 180 transfers the motion of the exhaust follower 182 to a second, identical, cylinder deactivation tappet 200*b*. The cylinder deactivation tappets 200*a*, 200*b* will be detailed in an upcoming description.

The cylinder deactivation tappets 200*a*, 200*b* reciprocate in a bore provided in the rocker housing 202. A two-position actuator 204 is secured to the rocker housing 202. In one position of the actuator 204, the cylinder deactivation tappets 200*a*, 200*b* are active and transfer motion from the push tubes 146, 180 to either the intake rocker lever 148 or the exhaust rocker lever 178. The intake rocker lever 148 and exhaust rocker lever 178 then actuate cross heads and intake and exhaust valves as discussed above. In a second position of the actuator 204, the cylinder deactivation tappets 200*a*, 200*b* are deactivated and absorb the motion from the push tubes 146, 180. In this mode, no motion (or reduced motion) is transferred to either the intake rocker lever 148 or the exhaust rocker lever 178. This state of operation in which no motion is transferred is known as cylinder deactivation.

Figure 5:
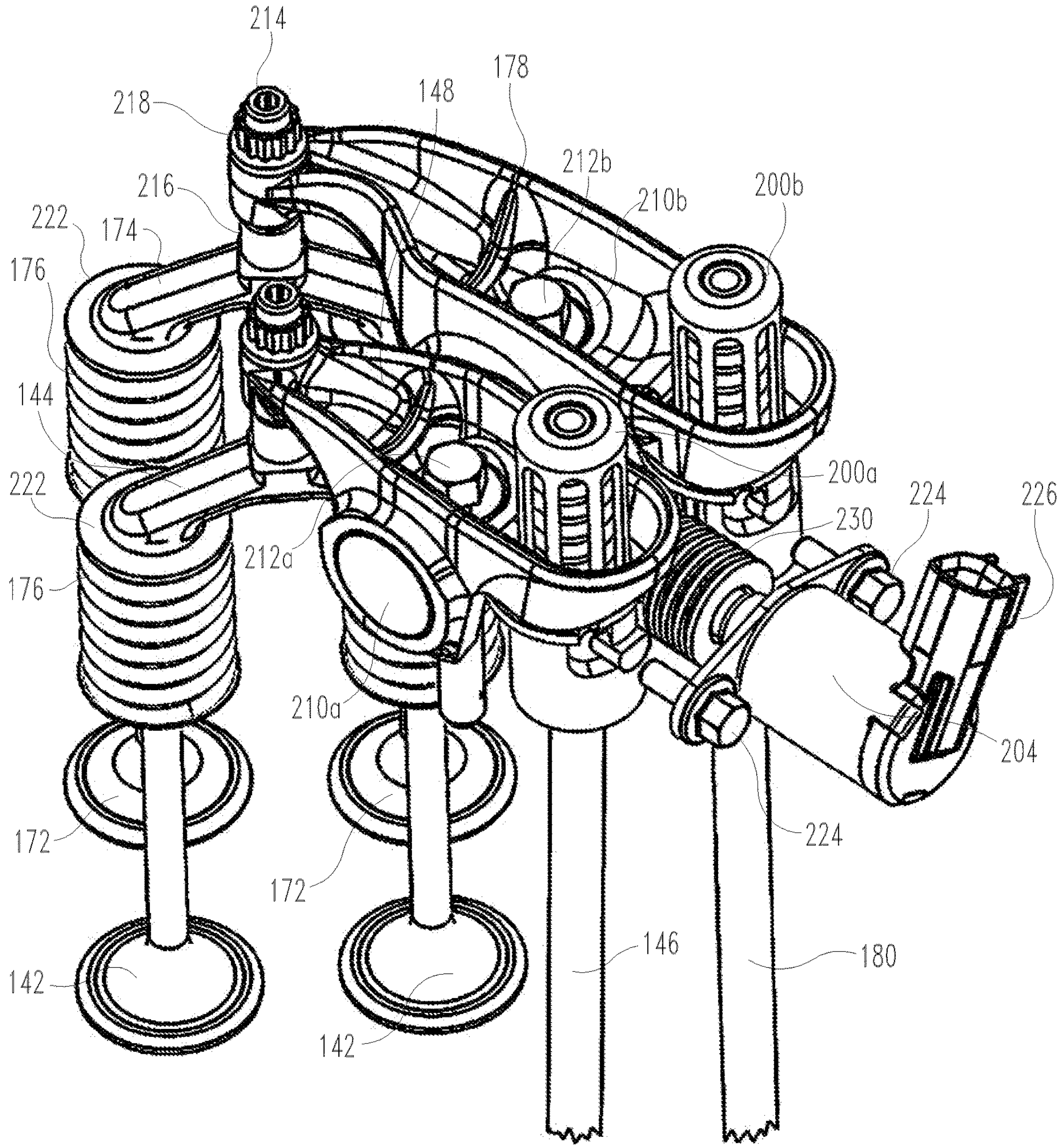
FIG. 5 is an isometric view of one embodiment valve lift mechanism for a single cylinder of the internal combustion engine.

Referring to FIG. 5, an embodiment of a valve opening mechanism for the valve lift system 170 is shown. As described earlier the motion of the camshaft lobes 152, 154 is transferred up through the intake and exhaust push tubes 146, 180. The intake rocker lever 148 and exhaust rocker lever 178 pivot about a respective one of rocker lever shafts 210*a*, 210*b*. The rocker lever shaft 210*a*, 210*b* is secured using central cap screws 212*a*, 212*b*. An adjusting screw 214 with a ball pivot foot 216 is located on the end of each of the rocker levers 148, 178. The adjusting screw 214 is used to set the lash between the ball pivot foot 216 and the valve cross head 144, 174 to a predetermined value during assembly. Once the lash value is achieved a locking nut 218 secures the adjusting screw 214 in the desired position. The valve cross head 144, 174 is used to transfer the motion of the rocker levers 148, 178 to either two intake valves 142 or two exhaust valves 172. The valves 142, 172 are secured in the cylinder head (not shown) with valve springs 176 and spring retainers 222.

Two cap screws 224 are used to secure the actuator 204 to the rocker lever housing 202. The actuator 204 is connected to the engine's wiring harness and ECM via an electrical connector 226. The actuator 204 actuates a rack 230 that engages with each of the cylinder deactivation tappets 200*a*, 200*b* and will be described later.

Figure 6:
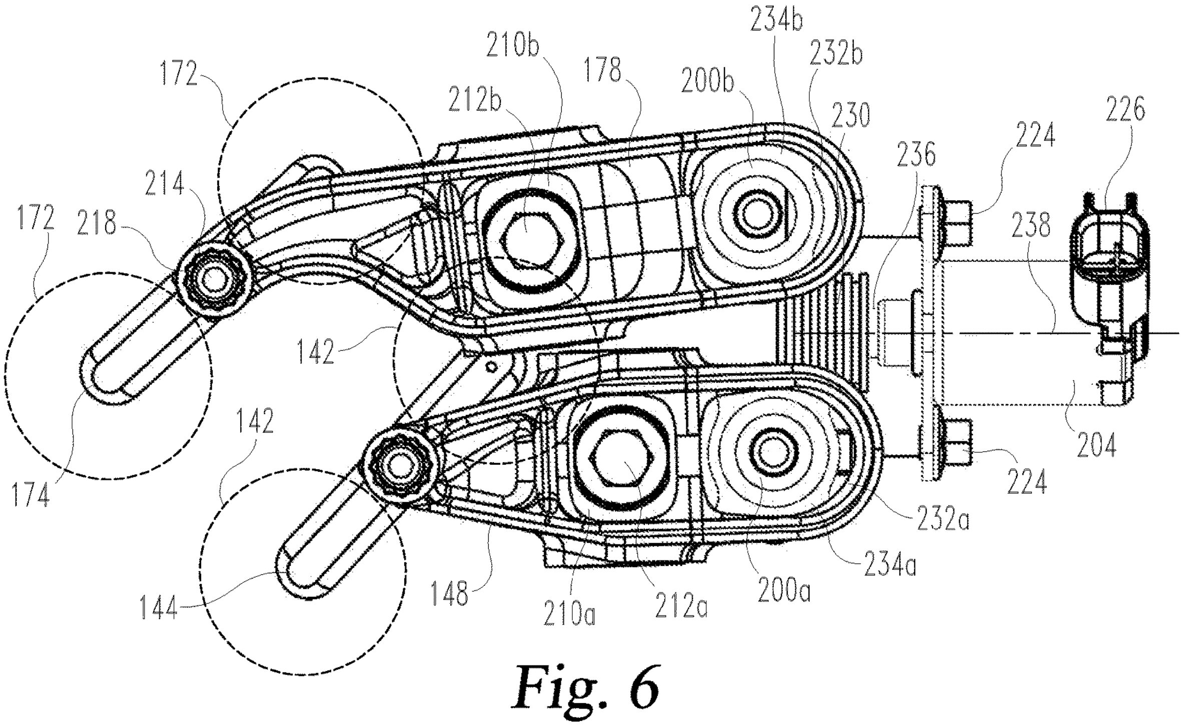
FIG. 6 is a top view of the valve lift mechanism of FIG. 5.

Referring further to FIG. 6, the cylinder deactivation tappet 200*a* passes through the intake rocker lever 148 via a slotted hole 232*a*. The cylinder deactivation tappet 200*a* interfaces with the intake rocker lever 148 via a collar 234*a*. Similarly, the cylinder deactivation tappet 200*b* passes through the exhaust rocker lever 178 via a slotted hole 232*b*. The cylinder deactivation tappet 200*b* interfaces with the exhaust rocker lever 178 via a collar 234*b*. The actuator 204 actuates the rack 230 that engages with each of the cylinder deactivation tappets 200*a*, 200*b*. The actuator 204 moves a pin 236 along an axis 238 to activate or deactivate the cylinder deactivation tappets 200*a*, 200*b*.

Figure 7:
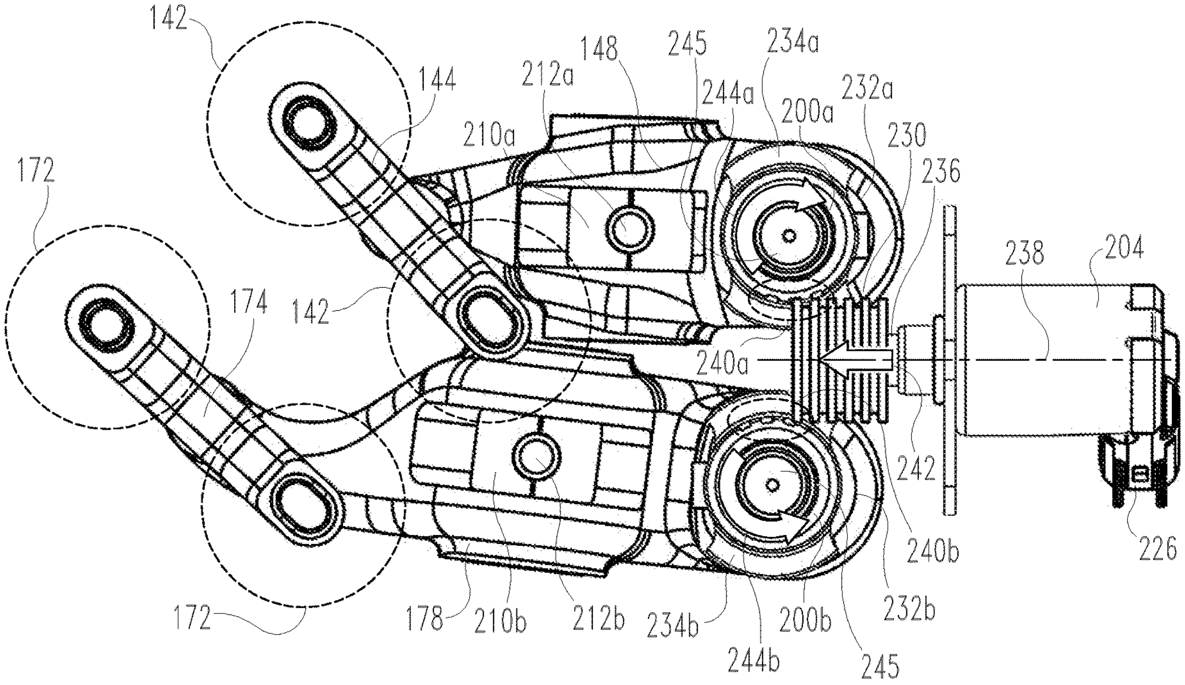
FIG. 7 is a bottom view of the valve lift mechanism of FIG. 5.

Referring further to FIG. 7, this view depicts the rack 230 in engagement with the cylinder deactivation tappet 200*a*, 200*b* at locations 240*a*, 240*b*. As the actuator pin 236 moves the rack 230 along axis 238 in the direction of arrow 242 it causes a rotation of the tappet 200*a*, 200*b* denoted by arrows 244*a* and 244*b*. Likewise, when the rack 230 moves in the opposite direction of arrow 242 the rotational movement of the cylinder deactivation tappet 200*a*, 200*b* is reversed along arrows 244*a* and 244*b*. This fore and aft motion of the actuator pin 236 can be controlled directly by the actuator 204 or in contrast, one of the motion directions could be controlled or aided by a spring (not shown).

Figure 8A:
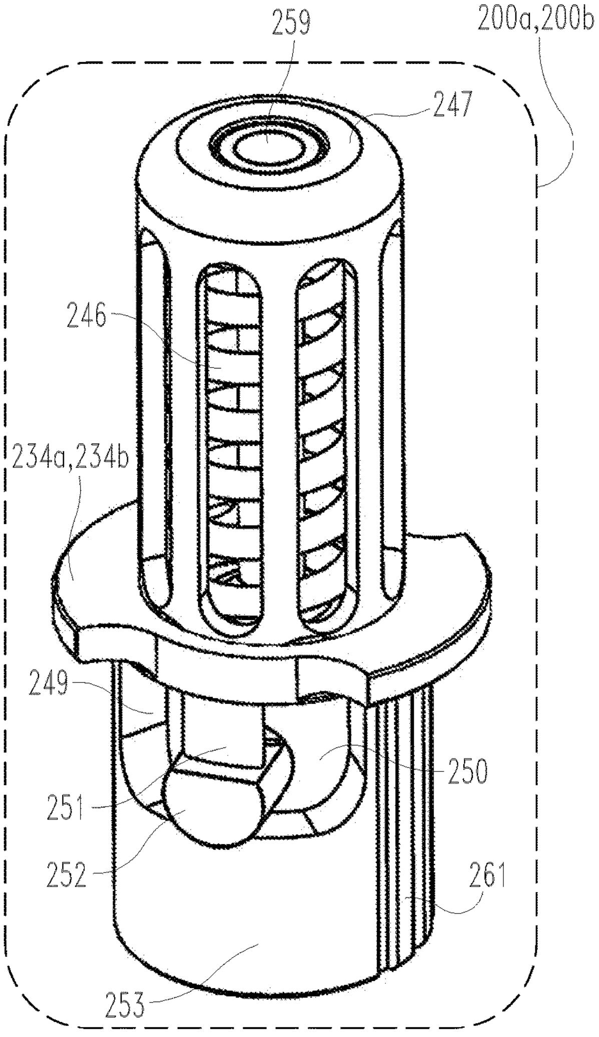
FIGS. 8A and 8B are an isometric view and a cross-sectional view, respectively, of a valve lift tappet of the valve lift mechanism of FIG. 5.
Figure 8B:
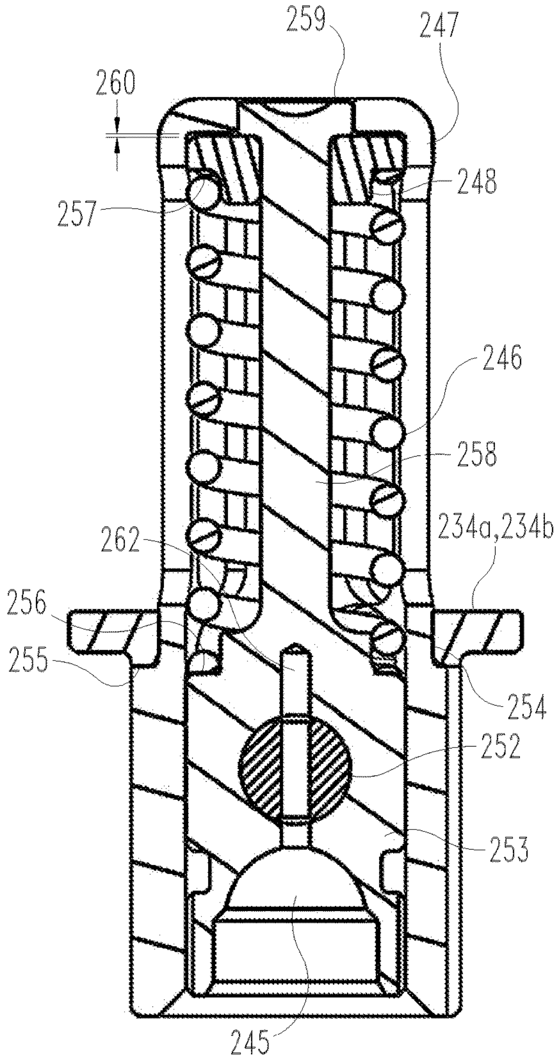

Referring to FIGS. 8A and 8B, the components of the cylinder deactivation tappet 200*a*, 200*b* are shown in both an isometric and a first cross-sectional view. The cylinder deactivation tappet 200*a*, 200*b* is constructed of an outer body 247 and an inner body 253. The inner body 253 contains a push tube socket 245 that engages with either the intake push tube 146 or the exhaust push tube 180. The inner body 253 also has an extension stem 258 inside a lost motion spring 246 that rests on a lost motion spring pad 256 on one end and a lost motion spring retainer 248 on the opposite end 257. The lost motion spring retainer 248 is constrained to the inner body 253 by the lost motion spring retainer stop 259. The lost motion spring retainer stop 259 could be formed in place following the assembly of the lost motion spring 246 and lost motion spring retainer 248 to capture the lost motion spring 246 with a certain amount of spring preload. Alternatively, the lost motion spring retainer stop 259 could be replaced by a wire ring or any other method to prevent the lost motion spring retainer 248 from sliding off the extension stem 258.

When the cylinder deactivation tappet 200*a*, 200*b* is oriented as shown in FIGS. 8A and 8B, it is said to be in the "active" mode. In this mode, the motion from the push tubes 146, 180 is transferred into the rocker levers 148, 178. The load from the push tube 146, 180 is transferred from the push tube socket 245 in the inner body 253 through a shear pin 252 that engages a triangular ledge 251 on the outer body 247. The outer body 247 transfers motion to the rocker levers 148, 178 via collar 234*a*, 234*b*. The collar 234*a*, 234*b* is pressed onto the outer body 247 at location 254 and is positively constrained at location 255. The collar 234*a*, 234*b* could be made from a different material or hardness than the outer body 247 to reduce wear between the rocker levers 148, 178 and the collar 234*a*, 234*b* interface. An oil hole 262 could be connected to an oil source, either pressurized or non-pressurized to provide lubrication to the push tube socket 245. Gear teeth 261 are machined into the outer body 247 along a radial sector to engage with the rack 230. A small amount of lash 260 is desired between the lost motion spring retainer 248 and the outer body 247 to minimize the force required from the actuator 204 as the outer body 247 is rotated around the inner body 253.

The inner body 253 is rotationally constrained to the rocker lever housing 202 via the shear pin 252. This rotation of the tappet outer body 247 transitions the cylinder deactivation tappet 200*a*, 200*b* from an "active" mode to a "deactivated" mode. This transition is done when the push tube 146, 180 is unloaded or, in other terms, the camshaft lobes 152, 154 are on a base circle or no lift condition. Two openings 249, 250 allow the shear pin 252 and inner body 253 to reciprocate up and down inside the outer body 247 without moving the rocker levers 148, 178. During this condition, the valve train is held in contact with the lost motion spring 246.

Figure 9A:
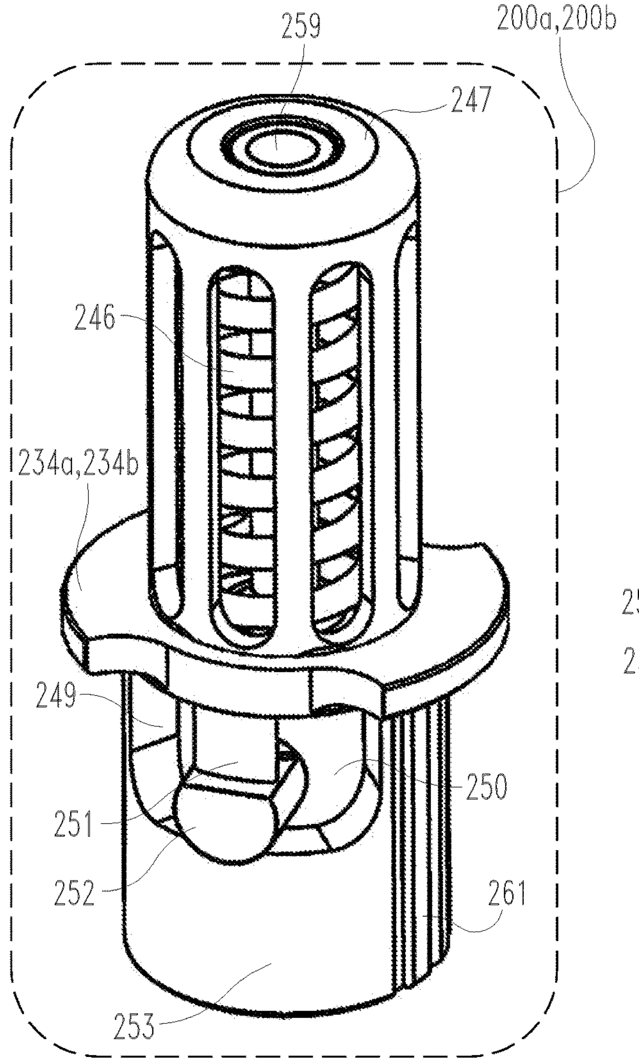
FIGS. 9A and 9B are an isometric view and another cross-sectional view, respectively, of the valve lift tappet of the valve lift mechanism of FIG. 5.
Figure 9B:
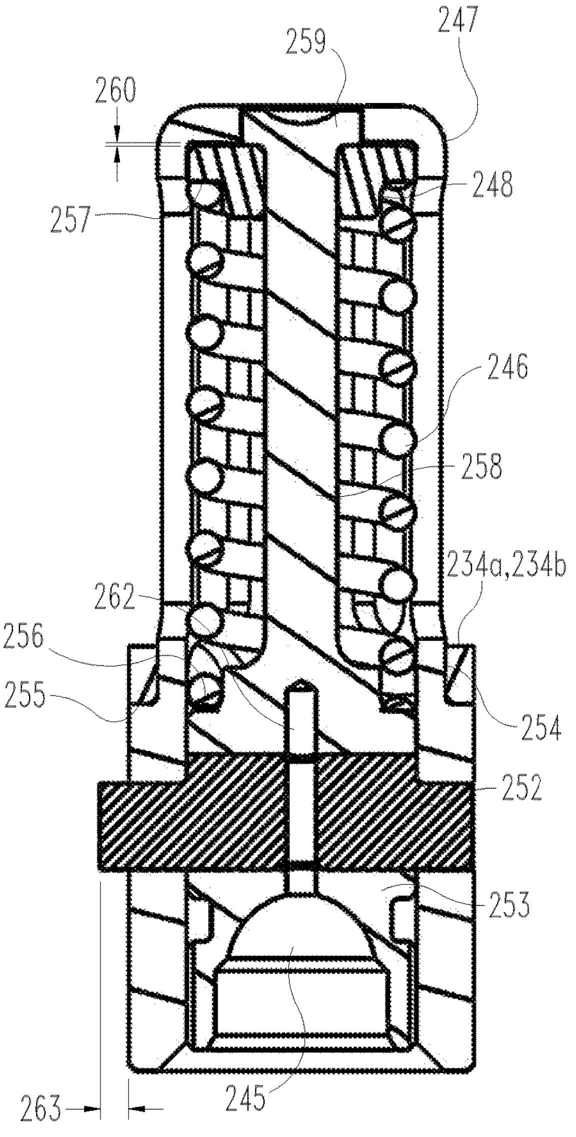

FIGS. 9A and 9B show the components of the cylinder deactivation tappet 200*a*, 200*b* in both an isometric and a second cross-sectional view offset 90 degrees from FIG. 8B orientation. In this view the shear pin 252 is shown to extend outside of the primary diameter of the outer body 247 by a dimension 263. This is provided so that the inner body 253 and its associated components remain stationary while the outer body 247 position can rotate from an "active" mode to a "deactivated" mode.

Figure 10:
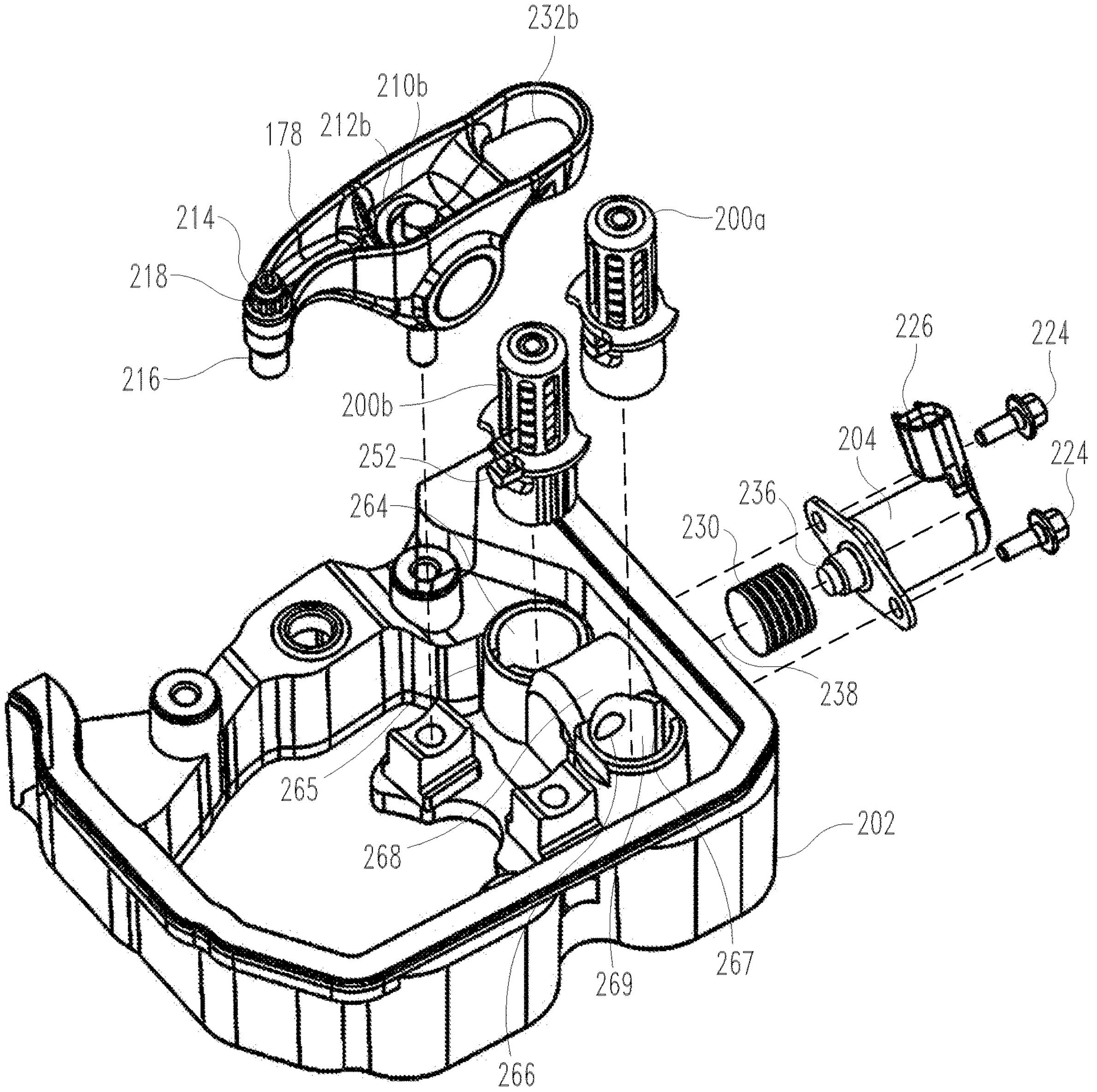
FIG. 10 is an exploded view of the valve lift mechanism of FIG. 5.

FIG. 10 illustrates an exploded view of a single cylinder deactivation mechanism. The intake rocker lever 148 has been omitted for clarity in the image. The cylinder deactivation tappets 200*a*, 200*b* are located in cylinder deactivation tappet bores 269, 264 in the rocker lever housing 202. Grooves 265, 267 are broached into the cylinder deactivation tappet bores 264, 269 to align the cylinder deactivation tappets 200*b*, 200*a* using the shear pin 252 which extends from the outer body by a distance 263. This also constrains rotation of the inner body 253 of the cylinder deactivation tappet 200*a*, 200*b* so that the rack 230 only rotates the outer body 247 during a cylinder deactivation event. The rack 230 is housed in a rack bore 268 in the rocker lever housing 202. The rack bore 268 breaks out into the cylinder deactivation tappet bores 264, 269 in location opening 266. The opening

266 allows the rack 230 to engage with the gear teeth 261 that are machined into the outer body 247 of each cylinder deactivation tappet 200*a*, 200*b*. The grooves 265, 267 are located 180 degrees from one another so that the same cylinder deactivation tappet design can be used for both intake and exhaust rocker levers 148, 178. This allows the rack 230 to impart different rotational directions 244*a*, 244*b* on the tappet 200*a*, 200*b* based on which side of the rack 230 the cylinder deactivation tappets 200*a*, 200*b* are located on.

Figure 11C:
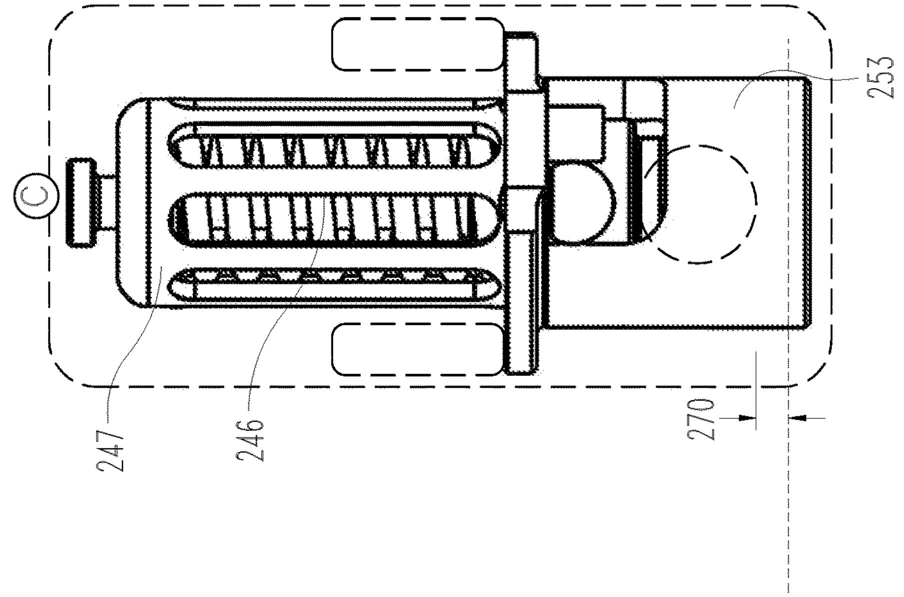
FIGS. 11A-11C illustrate various modes of operation of the valve lift tappet.
Figure 11B:
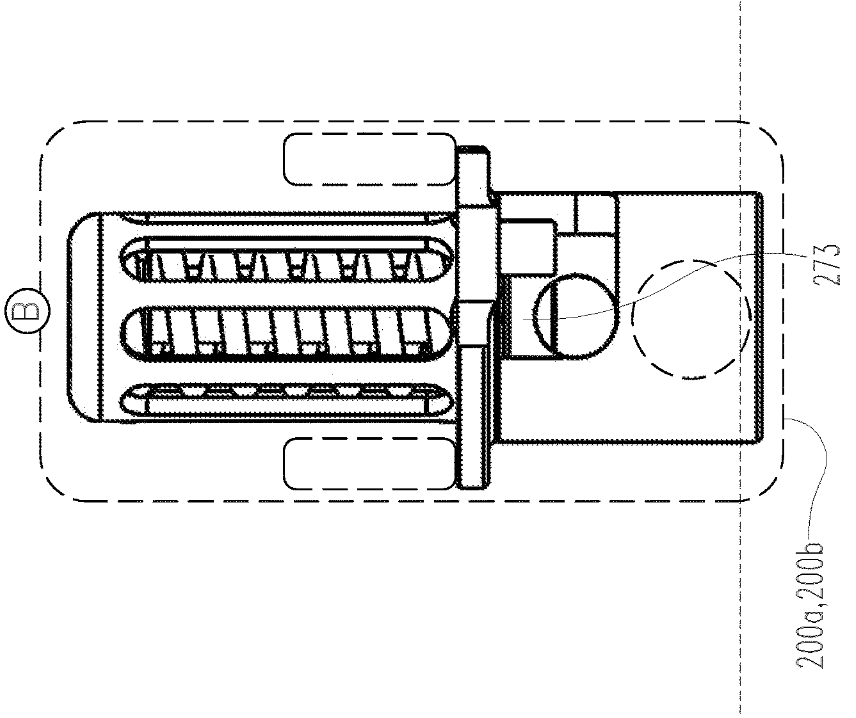
Figure 11A:
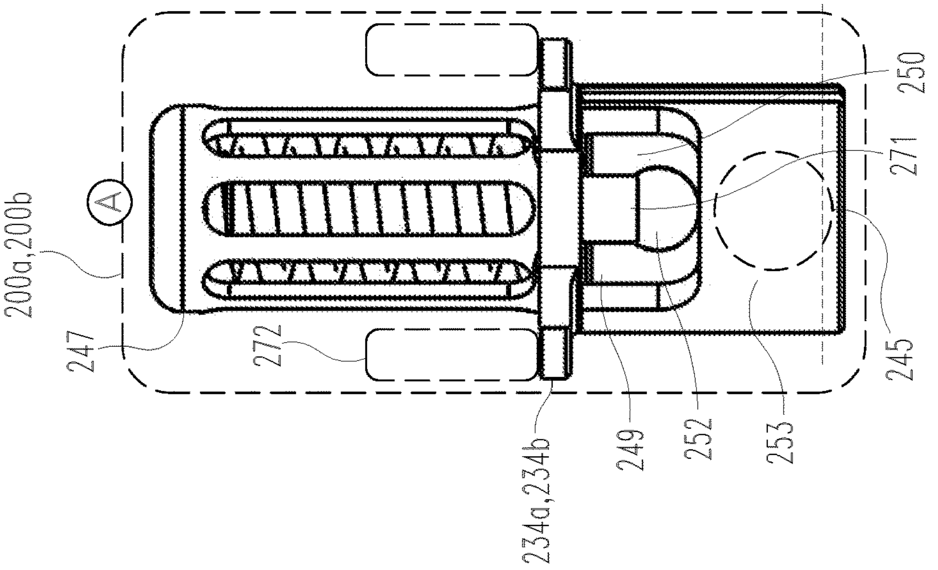

FIGS. 11A-11C illustrate the cylinder deactivation tappet modes of operation. In the mode of FIG. 11A, the inner body 253 is clocked with respect to the outer body 247 so the shear pin 252 is in direct contact with the outer body 247 at location 271. Motion from the cam lobes 154, 152, followers 145, 182 and push tubes 146, 180 is directly transferred through the cylinder deactivation tappet 200*a*, 200*b* into the rocker levers 148, 178 and into the valves 142, 172. The rocker lever interface 272 contacting the collar 234*a*, 234*b* is shown for clarity. In this mode the engine's cylinder is "active". In the mode of FIG. 11B, the outer body 247 has been clocked relative to the inner body 253 via the movement of the actuator 204, rack 232 and gear teeth 261. In this mode a gap 273 is now above the shear pin 252. As previously mentioned, the transition from FIG. 11A to FIG. 11B is performed when the valve train is unloaded. In FIG. 11C the push tube 146, 180 actuates the inner body 253, but since the shear pin 252 is not in axial contact with the outer body 247, the motion of the push tube 146, 180 is "lost", and the rocker levers 148, 178 remain stationary while the lost motion spring 246 is compressed. In this mode the engine's cylinder is "deactivated". The engine would continue to operate between the mode in FIG. 11B and the mode in FIG. 11C until the actuator 204 movement was reversed and the cylinder deactivation tappet 200*a*, 200*b* was reoriented to the FIG. 11A "active" mode position.

Figure 12:
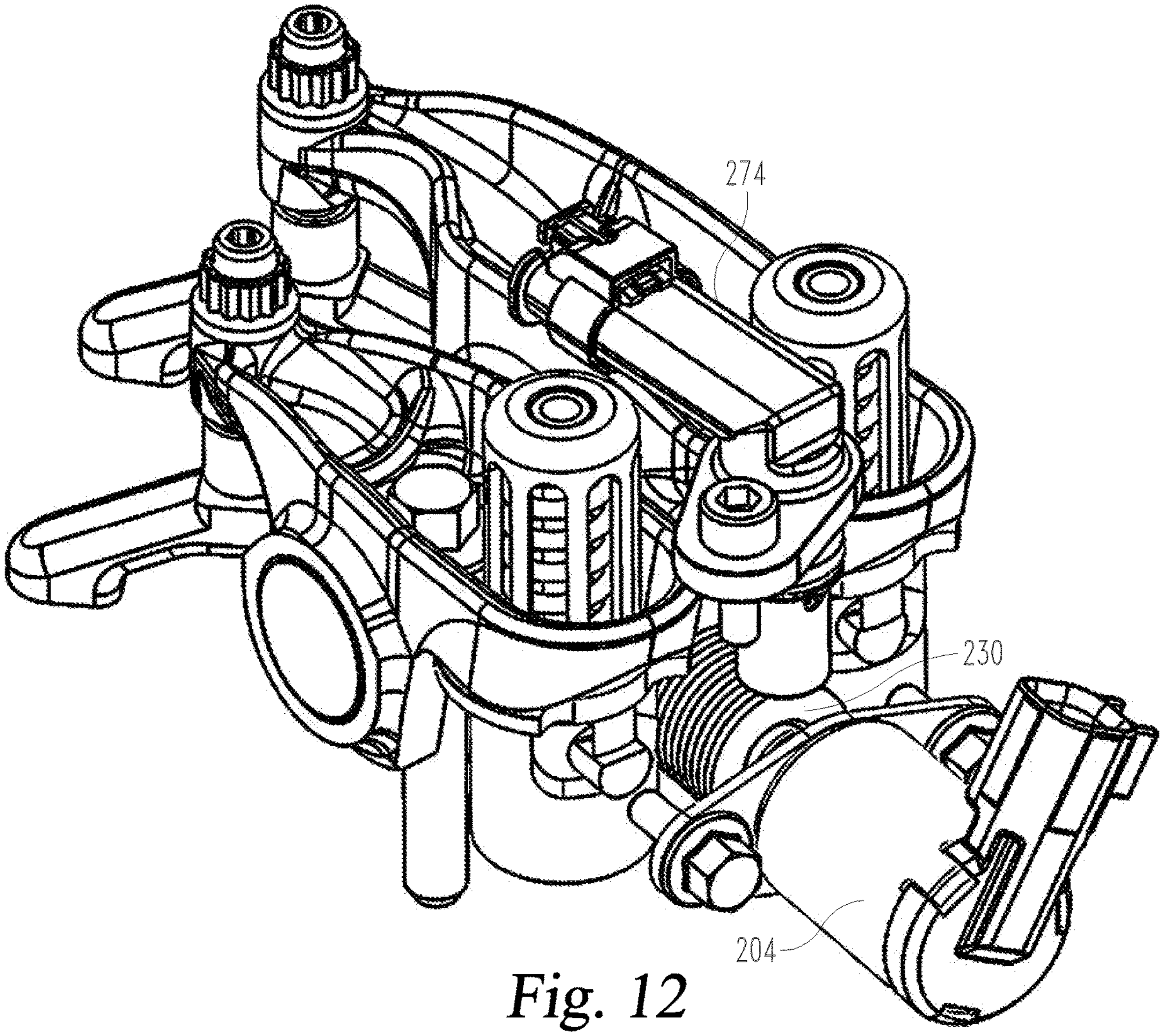
FIG. 12 is an isometric view of another embodiment of the valve lift mechanism of FIG. 5 with mode sensing.

FIG. 12 illustrates an optional mode sensor 274 that can be used to sense the position of the rack 230 via a Hall Effect strategy or other means. This type of feature could be beneficial for on-board diagnostics. The position sensing could also be combined inside the actuator 204 as a lower cost option.

Figure 13:
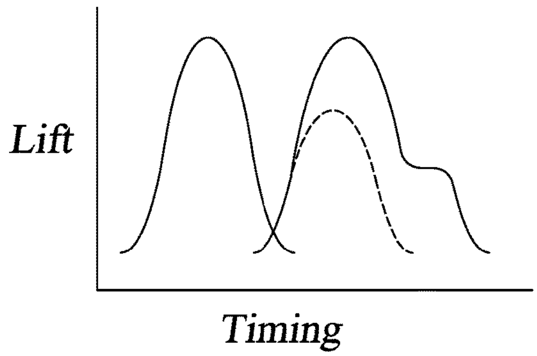
FIG. 13 shows an example of a modified valve lift for the valve lift mechanism of the present disclosure.

Although aspects of the present disclosure have been described in the context of cylinder deactivation, the tappet 200*a*, 200*b* (or tappet 1200*a*,1200*b* discussed below) need not absorb the entire lift and could be reconfigured to only absorb a partial amount of lift, and when combined with a stiff lost motion spring could produce a valve lift profile as shown in FIG. 13. This would allow for both a standard duration valve lift event and a shorter duration valve lift event. This type of operation is commonly known as Miller cycling. A similar arrangement could be employed on the exhaust side of the engine to enable Early Exhaust Valve Opening strategies. The tappet and actuator could also be expanded to allow for multiple levels of lift loss functionality instead of the two-mode operation described earlier. The cylinder deactivation tappet could also be configured with a hydraulic lash adjuster. Lastly, although the invention was described with an electronic actuator the system could also be configured with a hydraulic system to move the rack 230 using engine oil as the working fluid.

Figure 14:
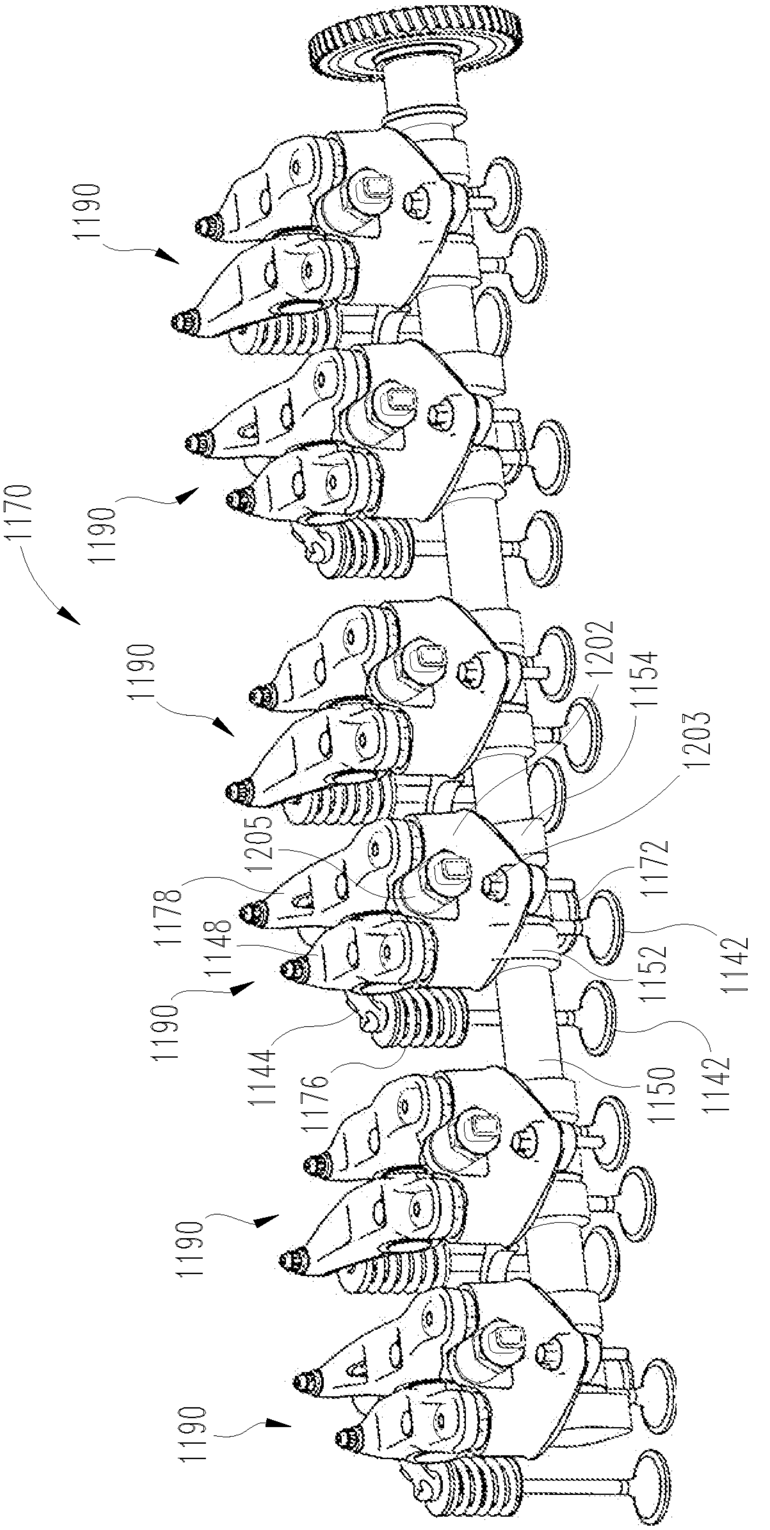
FIG. 14 shows another embodiment valve lift system for an overhead camshaft type of internal combustion engine.

Referring to FIG. 14, there is illustrated another embodiment of a valve lift system 1170 for an overhead cam type of engine 102. Valve lift system 1170 is mounted on a camshaft 1150 that is connected to at least one exhaust valve 1172 that is opened and closed by valve opening mechanism 1190 connected to an exhaust cam lobe 1154 of camshaft 1150. In the illustrated embodiment, the exhaust valve 1172 is a single valve, but another exhaust valve could be provided that is connected by an exhaust cross head (not shown.) Exhaust valve 1172 is connected to a valve spring 1176 an exhaust rocker lever 1178, which is rotatable about a rocker axis in response to an exhaust valve opening lobe of exhaust cam lobe 1154 pushing on the exhaust cam follower 1180 (FIG. 17) as the exhaust valve opening lobe of exhaust cam lobe 1154 passes against exhaust cam follower 1180.

One or more intake valves 1142 are also provided that are opened with valve opening mechanism 190. In the illustrated embodiment, the intake valve 1142 includes first and second intake valves connected by an intake cross head 1144. Each intake valve(s) 1142 further includes a valve spring(s) 1176 actuated by an intake rocker lever 1148 through intake cross head 1144 to open and close the intake valve(s) 1142 in response to an intake valve opening lobe on intake cam lobe 1152 acting on intake cam follower 1146.

Valve lift system 1170 further includes each valve opening mechanism 1190 employing a valve lift tappet 1200*a*, 1200*b* on each of the cam followers 1146, 1180, respectively. Each tappet 1200*a*, 1200*b* is operable to provide for variable lift of the intake and/or exhaust valves 1142, 1172 when a lift profile that varies from a standard or nominal lift profile is desired, such as during cylinder deactivation or Miller cycling.

Figure 15:
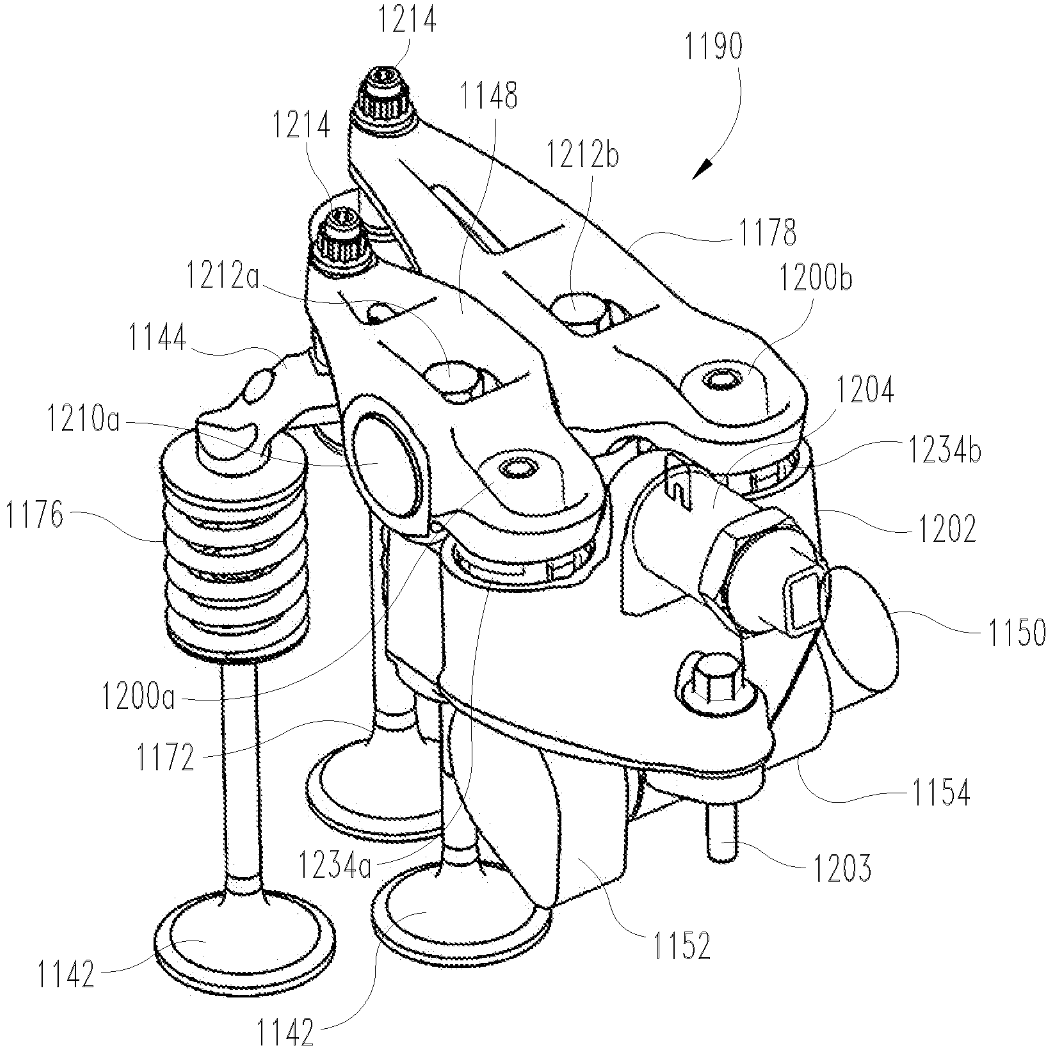
FIG. 15 is an isometric view of one embodiment valve lift mechanism for the valve lift system of FIG. 14.
Figure 16:
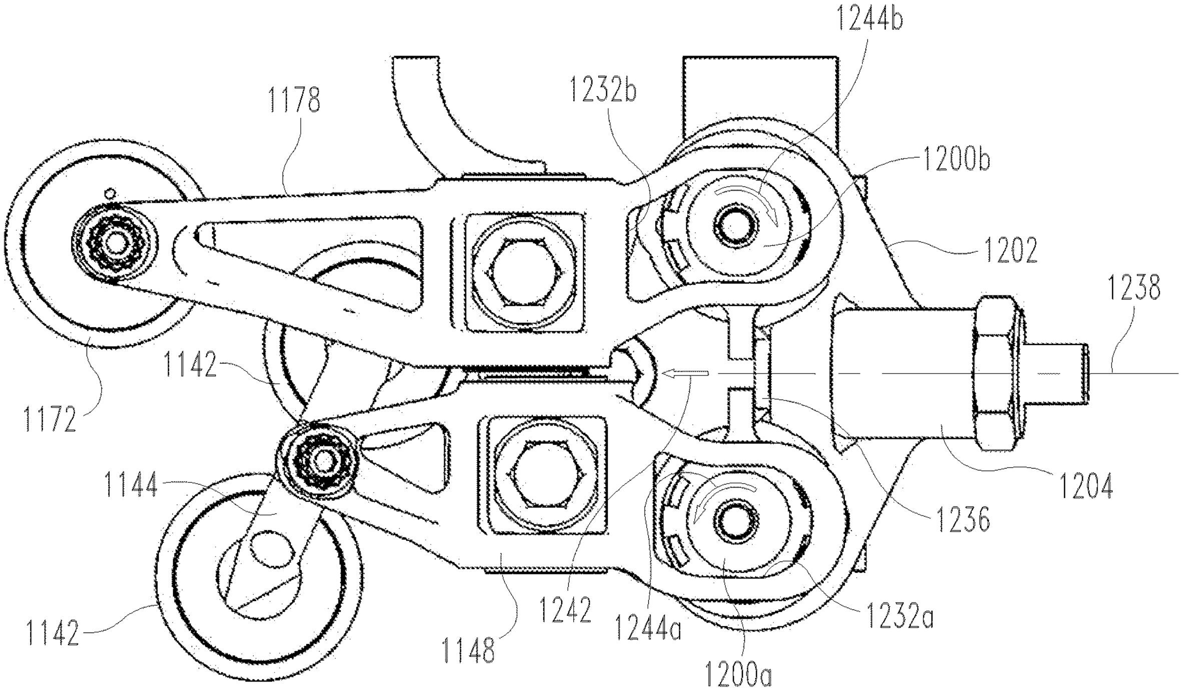
FIG. 16 is a top view of the valve lift mechanism of FIG. 15.
Figure 17:
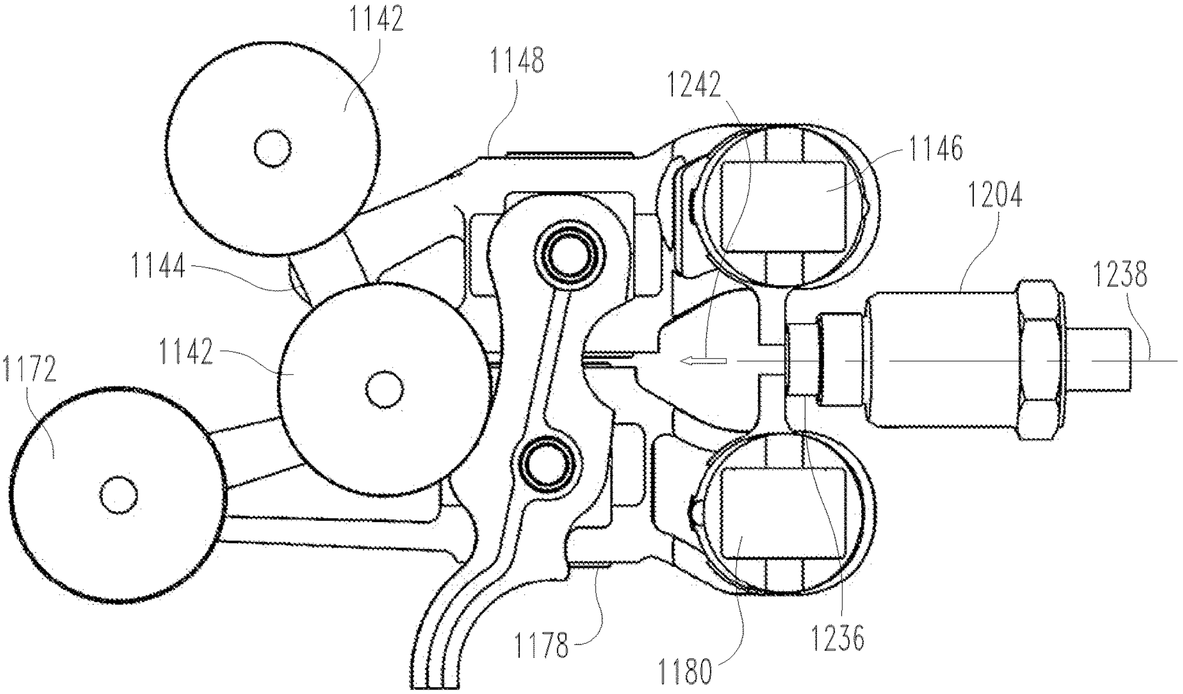
FIG. 17 is a bottom view of the valve lift mechanism of FIG. 15.

Referring to FIGS. 15-17, the cylinder deactivation tappets 1200*a*, 1200*b* reciprocate in a bore provided in a cam cap 1202, which may be secured to the cylinder head, cam shaft carrier, or valve cover of the engine with fastener 1203. An actuator 1204 is secured to the cam cap 1202. The actuator 1204 can be connected to the engine's wiring harness and ECM via an electrical connector. In one position of the actuator 1204, the cylinder deactivation tappets 1200*a*, 1200*b* are active and transfer motion from the cam followers 1146, 1180 to either the intake rocker lever 1148 or the exhaust rocker lever 1178. The intake rocker lever 1148 and exhaust rocker lever 1178 then actuate cross heads (if provided) and intake and exhaust valves as discussed above. In a second position of the actuator 1204, the cylinder deactivation tappets 1200*a*, 1200*b* are deactivated and absorb the motion from the cam lobes 1152, 1154. In this mode, no motion (or reduced motion) is transferred to either the intake rocker lever 1148 or the exhaust rocker lever 1178. This state of operation in which no motion is transferred is known as cylinder deactivation.

As described earlier the motion of the camshaft lobes 1152, 1154 is transferred up through the intake and exhaust cam followers 1146, 1180. The intake rocker lever 1148 and exhaust rocker lever 1178 pivot about a respective one of rocker shafts 1210*a*, 1210*b*. The rocker shaft 1210*a*, 1210*b* is secured using central cap screws 1212*a*, 1212*b*. An adjusting screw 1214 may also be provided to set the lash to a predetermined value during assembly. The valve cross head 1174 is used to transfer the motion of the rocker lever 1178 to the two exhaust valves 1172.

The cylinder deactivation tappet 1200*a* passes through the intake rocker lever 1148 via a slotted hole 1232*a*. The cylinder deactivation tappet 1200*a* interfaces with the intake rocker lever 1148 via a collar 1234*a*. Similarly, the cylinder deactivation tappet 1200*b* passes through the exhaust rocker lever 1178 via a slotted hole 1232*b*. The cylinder deactivation tappet 1200*b* interfaces with the exhaust rocker lever 1178 via a collar 1234*b*. The actuator 1204 moves a pin 1236 along an axis 1238 to activate or deactivate the cylinder deactivation tappets 1200*a*, 1200*b*.

As the actuator pin 1236 moves along axis 1238 in the direction of arrow 1242 it causes a rotation of the tappet 1200*a*, 1200*b* denoted by arrows 1244*a* and 1244*b*. Likewise, when the pin 1236 moves in the opposite direction of arrow 1242 the rotational movement of the cylinder deactivation tappet 1200*a*, 1200*b* is reversed along arrows 1244*a* and 1244*b*. This fore and aft motion of the actuator pin 1236 can be controlled directly by the actuator 1204 or in contrast, one of the motion directions of the tappets 1200*a*, 1200*b* could be controlled or aided by a spring, such as for the reverse motion.

Figure 18A:
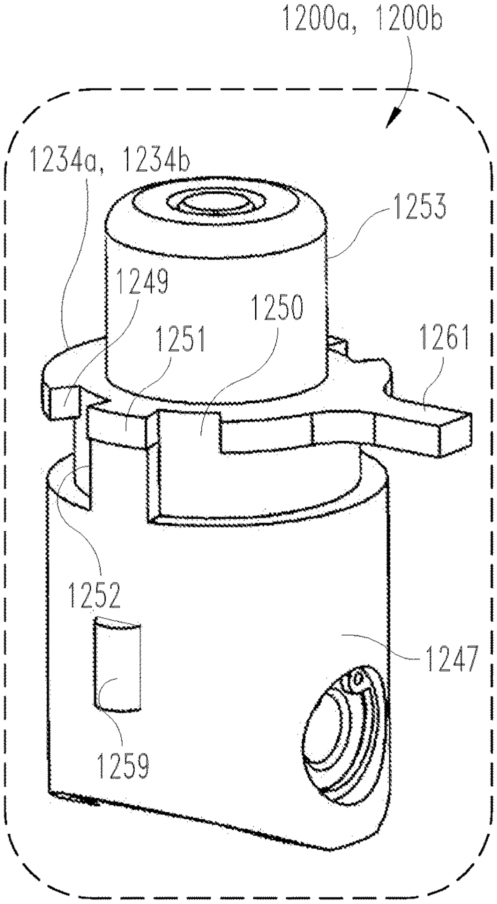
FIGS. 18A and 18B are an isometric view and a cross-sectional view, respectively, of a valve lift tappet of the valve lift mechanism of FIG. 15.
Figure 18B:
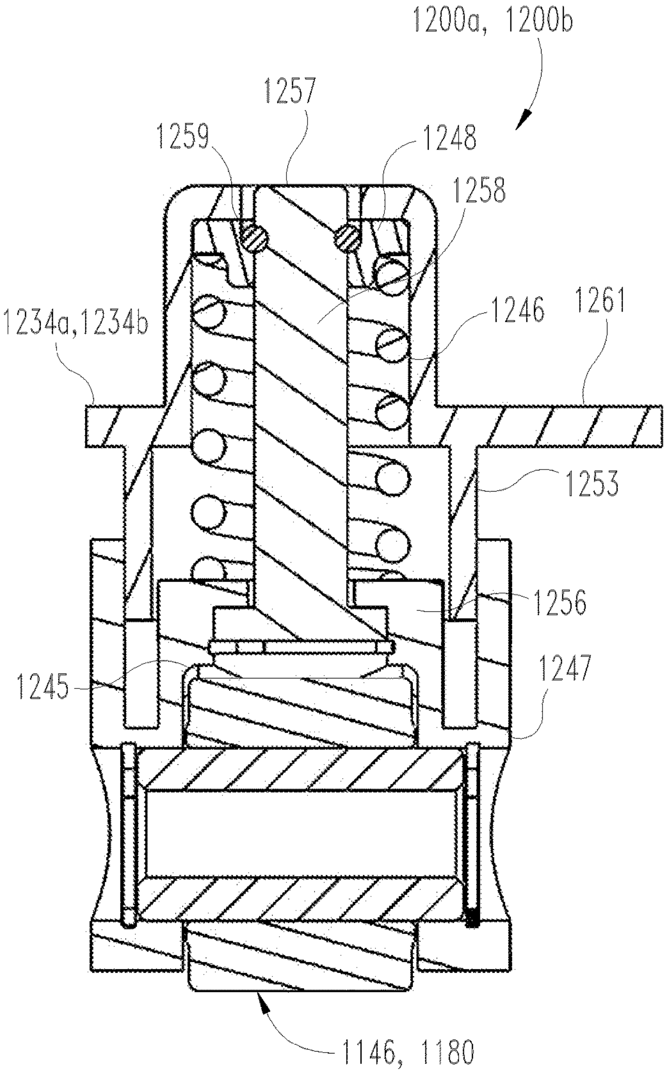

Referring to FIGS. 18A and 18B, the components of the cylinder deactivation tappet 1200*a*, 1200*b* are shown in both an isometric and a first cross-sectional view. The cylinder deactivation tappet 1200*a*, 1200*b* is constructed of an outer body 1247 and an inner body 1253. The outer body 1247 contains a cam follower socket 1245 that contains the corresponding cam follower 1146, 1180. The outer body 1247 also has a lost motion spring pad 1256 located therein. The outer body 1247 and inner body 1253 house an extension stem 1258 inside a lost motion spring 1246 that rests on lost motion spring pad 1256 on one end and a lost motion spring retainer 1248 on the opposite end 1257. The lost motion spring retainer 1248 is constrained to the outer body 1247 by the lost motion spring retainer stop 1259, or any suitable wire ring or device to prevent the lost motion spring retainer 1248 from sliding off the extension stem 1258.

When the cylinder deactivation tappet 1200*a*, 1200*b* is oriented as shown in FIGS. 18A and 18B, it is said to be in the “active” mode. In this mode, the motion from the cam followers 1146, 1180 is transferred into the rocker levers 1148, 1178. The load from the cam followers 1146, 1180 is transferred from the cam follower socket 1245 in the outer body 1247 through an axial arm 1252 that extends axially from an upper end of outer body 1247 to engage a ledge 1251 on collar 1234*a*, 1234*b* of inner body 1253. The inner body 1253 transfers motion to the rocker levers 1148, 1178 via collar 1234*a*, 1234*b*. The collar 1234*a*, 1234*b* also include a radially extending arm 1261 that is engaged by the actuator 1204 to rotate the collar 1234*a*, 1234*b* when cylinder deactivation is desired.

The outer body 1247 is rotationally constrained to the rocker levers 1148, 1178 via the guide pin 1259. This rotation of the tappet inner body 1253 transitions the cylinder deactivation tappet 1200*a*, 1200*b* from an “active” mode to a “deactivated” mode. This transition is done when the camshaft lobes 1152, 1154 are on a base circle or no lift condition. Two openings or gaps 1249, 1250 in collar 1234*a*, 1234*b* allow the axial arm 1252 and outer body 1247 to reciprocate up and down relative to the inner body 1253 without moving the rocker levers 1148, 1178. During this condition, the valve train is held in contact with the lost motion spring 1246.

Figure 19A:
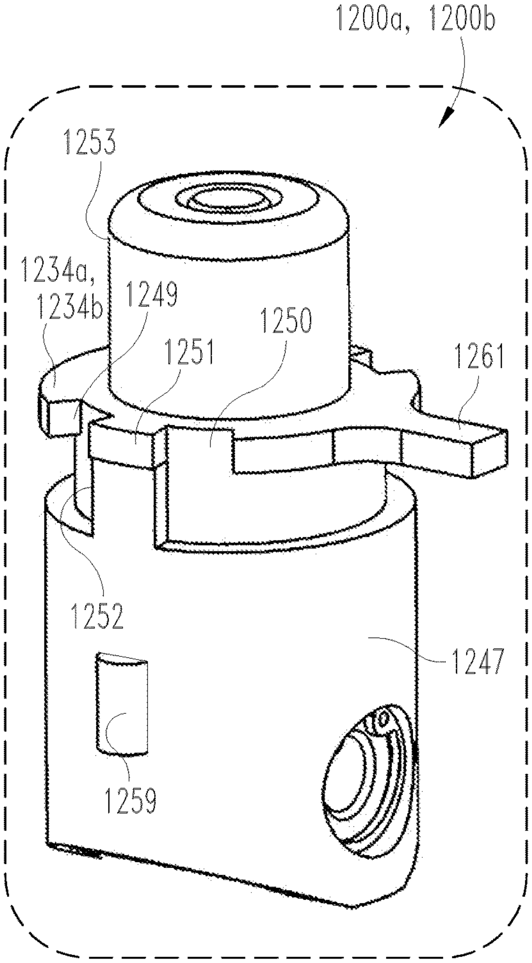
FIGS. 19A and 19B are an isometric view and another cross-sectional view, respectively, of the valve lift tappet of the valve lift mechanism of FIG. 15.
Figure 19B:
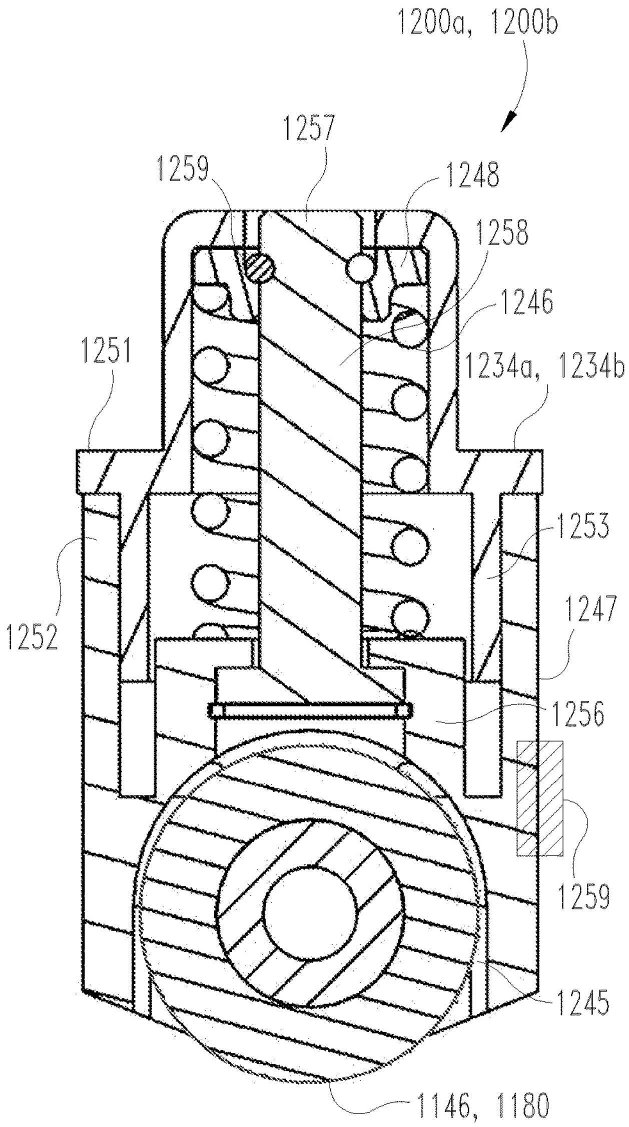

FIGS. 19A and 19B show the components of the cylinder deactivation tappet 1200*a*, 1200*b* in both an isometric and a second cross-sectional view offset 90 degrees from the FIG. 18B orientation. In this view the axial arm 1252 is shown to extend into contact with ledge 1251 on collar 1234*a*, 1234*b* of inner body 1253. Also, guide pin 1259 is provided so that outer body 1247 can engage the cam cap 1204 and remain stationary while the inner body 1253 position can rotate from an “active” mode to a “deactivated” mode.

Figure 20:
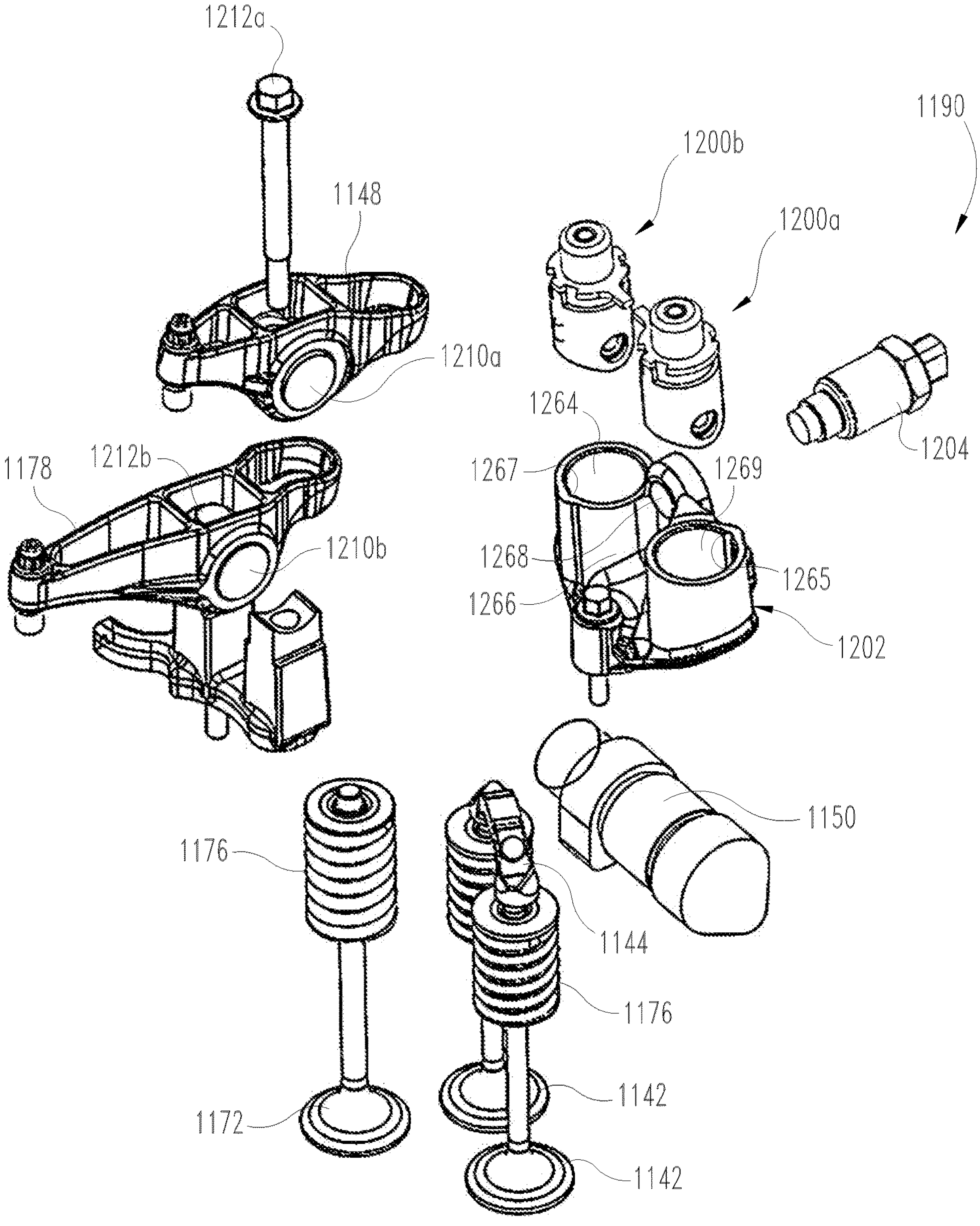
FIG. 20 is an exploded view of the valve lift mechanism of FIG. 15.

FIG. 20 illustrates an exploded view of a single cylinder deactivation mechanism. The cylinder deactivation tappets 1200*a*, 1200*b* are located in cylinder deactivation tappet bores 1269, 1264 in the cam cap 1202. Grooves 1265, 1267 are broached into the cylinder deactivation tappet bores 1269, 1264 to align the cylinder deactivation tappets 1200*b*, 1200*a* using the guide pin 1259, which also constrains rotation of the outer body 1247 of the cylinder deactivation tappet 1200*a*, 1200*b* so that the actuator 1204 only rotates the inner body 1253 during a cylinder deactivation event. The actuator 1204 is housed in a bore 1268 in the cam cap 1202. The bore 1268 breaks out into the cylinder deactivation tappet bores 1264, 1269 in location opening 1266. The opening 1266 allows the actuator 1204 to contact the radial arms 1261 of each cylinder deactivation tappet 1200*a*, 1200*b*. The grooves 1265, 1267 are located 180 degrees from one another so that the same cylinder deactivation tappet design can be used for both intake and exhaust rocker levers 1148, 1178.

Figure 21A:
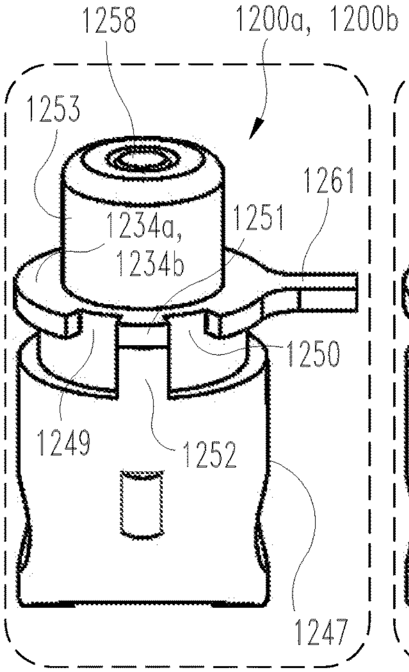
FIGS. 21A-21C illustrate various modes of operation of the valve lift tappet of FIG. 15.
Figure 21B:
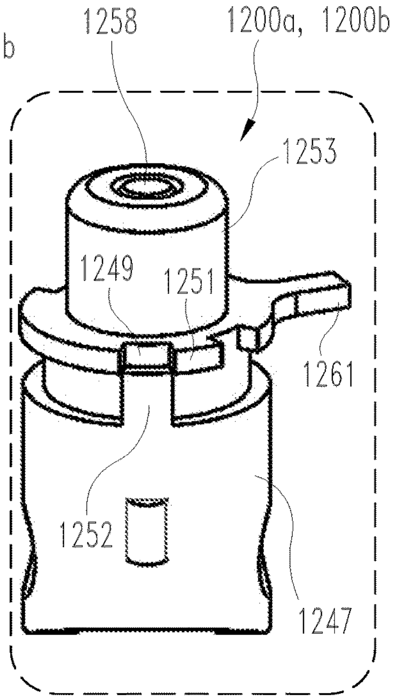
Figure 21C:
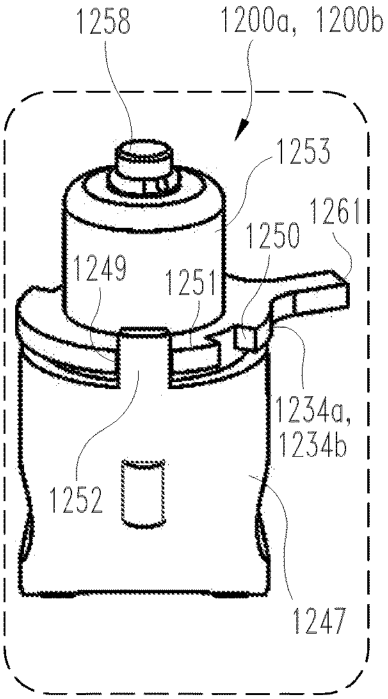

FIGS. 21A-21C illustrate the cylinder deactivation tappet modes of operation. In the mode of FIG. 21A, the outer body 1247 is clocked with respect to the inner body 1253 so the axial arm 1252 is in direct contact with the ledge 1251 of collar 1234*a*, 1234*b*. Motion from the cam lobes 1152, 1154 and cam followers 1146, 1180 is directly transferred through the cylinder deactivation tappet 1200*a*, 1200*b* into the rocker levers 1148, 1178 and into the valves 1142, 1172. In this mode the engine’s cylinder is “active”. In the mode of FIG. 21B, the inner body 1253 has been clocked relative to the outer body 1247 via the movement of the actuator 204. In this mode a gap 1249 is now above the axial arm 1252. As previously mentioned, the transition from FIG. 21A to FIG. 21B is performed when the valve train is unloaded. In FIG. 21C the cam follower 1146, 1148 actuates the outer body 1247, but since the axial arm 1252 is not in axial contact with the inner body 1253, the motion of the cam follower 1146, 1180 is “lost”, and the rocker levers 1148, 1178 remain stationary while the lost motion spring 1246 is compressed. In this mode the engine’s cylinder is “deactivated”. The engine would continue to operate between the mode in FIG. 21B and the mode in FIG. 21C until the actuator 1204 movement was reversed and the cylinder deactivation tappet 1200*a*, 1200*b* was reoriented to the FIG. 21A “active” mode position via a return spring or the like.

Various aspects of the present disclosure are contemplated. For example, a valve train assembly of an internal combustion engine includes a tappet located between the camshaft and the intake or exhaust valve. The tappet has at least two modes of operation. One mode transfers all cam lobe motion to the intake or exhaust valve, and a second mode transfers a partial or no cam lobe motion to the intake or exhaust valve. The tappet modes are adjusted with an actuator that changes the angular orientation of the inner and outer bodies of the tappet.

In another aspect, the valve train assembly of an internal combustion engine includes at least two tappets located between the camshaft and the corresponding intake and/or exhaust valves. Each tappet has at least two modes of operation. One mode transfers all cam lobe motion to the intake and exhaust valves and a second mode transfers a partial or no cam lobe motion to the intake and exhaust valves. The tappet modes are adjusted simultaneously with one actuator that changes the angular orientation between inner and outer bodes of each tappet.

In another aspect, a valve train assembly of an internal combustion engine includes a rocker housing which houses at least one tappet. The at least one tappet has at least two modes of operation. One mode transfers all cam lobe motion to the intake or exhaust valve, and a second mode transfers a partial or no cam lobe motion to the intake or exhaust valve.

In another aspect, the valve train assembly of an internal combustion engine includes at least one rocker lever assembly. The at least one rocker lever assembly directly contacts at least one tappet. The at least one tappet has at least two modes of operation. One mode transfers all cam lobe motion to the intake or exhaust valve, and a second mode transfers a partial or no cam lobe motion to the intake or exhaust valve.

According to another aspect, an internal combustion engine system includes a cylinder housing a piston operably connected to a crankshaft. The cylinder further includes at least one intake valve and at least one exhaust valve for selectively opening and closing respective ones of at least one intake opening and at least one exhaust opening of the cylinder. The internal combustion engine system also includes a camshaft including a first cam lobe and a second cam lobe, with the first and second cam lobes being rotatable with rotation of the camshaft. The internal combustion engine system also includes a valve lifting mechanism linking the first and second cam lobes to respective ones of the at least one intake valve and the at least one exhaust valve. The valve lifting mechanism includes a first tappet linking the at least one intake valve to the first cam lobe and a second tappet linking the at least one exhaust valve to the second cam lobe. The valve lifting mechanism includes a single actuator that simultaneously reconfigures the first and second tappets from a first configuration in which all motion from the first and second cam lobes is imparted to the linked at least one intake valve and at least one exhaust valve, to a second configuration in which less than all motion from the first and second cam lobes is imparted to the linked at least one intake valve and at least one exhaust valve.

In an embodiment, the actuator includes a rack that is engaged to an outer surface of each of the first and second tappets so that rotation of the rack rotates a part of each of the first and second tappets from the first configuration to the second configuration.

In an embodiment, each of the first and second tappets includes an inner body housed within an outer body, and in the first configuration the inner and outer bodies are axially locked to prevent axial movement relative to one another and in the second configuration the outer body is rotated relative to the inner body so the inner and outer bodies are axially unlocked to permit axial movement relative to one another.

In an embodiment, the valve lifting mechanism includes a first rocker lever connected to the at least one intake valve, an intake cam follower contacting the first cam, and an intake push tube connecting the intake cam follower to the first tappet. The valve lifting mechanism also includes a second rocker lever connected to the at least one exhaust valve, an exhaust cam follower contacting the second cam, and an exhaust push tube connecting the exhaust cam follower to the second tappet.

In an embodiment, in the second configuration of the first and second tappets the intake push rod and the exhaust push rod are each allowed to translate relative to the first tappet and the second tappet, respectively, in response to the first and second cam lobes contacting the intake cam follower and the exhaust cam follower, respectively, so the at least one intake valve and the at least one exhaust valve remain closed.

In an embodiment, the first tappet and the second tappet each include: an outer body including a collar engaged to the corresponding one of the first rocker lever and the second rocker lever; and an inner body engaged to the corresponding one of the intake push tube and the exhaust push tube.

In an embodiment, in the first configuration the inner and outer bodies of each of the first and second tappets are locked so that displacement of the intake push tube and the exhaust push tube by the first cam lobe and the second cam lobe, respectively, act on and pivot the corresponding one of the first rocker lever and the second rocker lever, and in the second configuration of the inner and outer bodies of each of the first and second tappets are unlocked so that displacement of the intake push tube and the exhaust push tube by the first cam lobe and the second cam lobe, respectively, is lost by displacement of the inner bodies within the outer bodies without acting on the corresponding one of the first rocker lever and the second rocker lever.

In an embodiment, the first and second tappets are housed in a rocker housing, and the actuator is mounted to the rocker housing and extends through a bore in the rocker housing to a location between the first and second tappets. In an embodiment, the first and second tappets are in direct contact with respective ones of a first rocker lever assembly and a second rocker lever assembly housed in the rocker housing.

In an embodiment, the actuator includes a pin that is actuated to contact a radially extending arm of each of the first and second tappets so that displacement of the pin rotates a part of each of the first and second tappets from the first configuration to the second configuration.

In an embodiment, each of the first and second tappets includes an inner body housed within an outer body, and in the first configuration the inner and outer bodies are axially locked to prevent axial movement relative to one another and in the second configuration the inner body is rotated relative to the outer body so the inner and outer bodies are axially unlocked to permit axial movement relative to one another.

In an embodiment, the valve lifting mechanism includes: a first rocker lever connected to the at least one intake valve and an intake cam follower contacting the first cam and the first tappet; and a second rocker lever connected to the at least one exhaust valve and an exhaust cam follower contacting the second cam and the second tappet.

In another aspect, a tappet for modifying a valve lift in a valve train system for an internal combustion engine includes an elongated inner body housed within an outer body. The inner body and the outer body include a locked configuration in which the inner body and the outer body are axially constrained relative to one another in order to provide a first valve lift in response a cam lobe profile acting on the tappet. The inner body and the outer body are rotated axially relative to one another to an unlocked configuration to provide a second valve lift in response to the cam lobe profile acting on the tappet, with the second valve lift being less than the first valve lift.

In an embodiment, the inner body is spring-biased relative to the outer body toward the locked configuration. In an embodiment, the outer body includes outer teeth that are engaged by an actuator to rotate the outer body relative to the inner body. In an embodiment, the outer body includes a collar extending outwardly therefrom that is for direct contact with a rocker lever of the valve train assembly.

In an embodiment, a shear pin is engaged to the inner body and extends through the outer body. In the locked configuration the shear pin is in contact with the outer body to prevent axial movement of the inner body relative to the outer body, and in the unlocked configuration the shear pin is aligned with an axially extending opening in the outer body to allow axial movement of the inner body relative to the outer body.

In another aspect, a valve train system for an internal combustion engine includes a rocker housing and at least one tappet positioned within the rocker housing. The at least one tappet is configured for operation in a first mode and in a second mode. In the first mode the at least one tappet is configured to transfer a first valve lift in response to a cam lobe profile acting on the at least one tappet, and in the second mode the at least one tappet is configured to transfer a second valve lift in response to the cam lobe profile acting on the at least one tappet, where the second valve lift is less than the first valve lift.

In an embodiment, the at least one tappet includes an elongated inner body housed within an outer body. In the first mode the inner body and the outer body are axially constrained relative to one another, and in the second mode the inner body and the outer body are rotated axially relative to one another so the inner body and the outer body are axially movable relative to one another. In a further embodiment, an actuator is mounted to the rocker housing that is engaged to the at least one tappet to axially rotate the inner body and the outer body relative to one another.

In an embodiment, a rocker lever is provided in the rocker housing that is positioned around and in direct contact with the at least one tappet. The at least one tappet pivots the rocker lever in response to a valve lift.

In another aspect, a valve train system for an internal combustion engine includes a rocker lever and at least one tappet positioned in direct contact with the rocker lever for pivoting the rocker lever. The at least one tappet is configured for operation in a first mode and in a second mode. In the first mode the at least one tappet is configured to transfer a first valve lift through the rocker lever in response to a cam lobe profile acting on the at least one tappet, and in the second mode the at least one tappet is configured to transfer a second valve lift through the rocker lever in response to the cam lobe profile acting on the at least one tappet, wherein the second valve lift is less than the first valve lift.

In an embodiment, a rocker housing is provided, and the at least one tappet is positioned in the rocker housing. The rocker lever is position in the rocker housing around the at least one tappet.

In another aspect, a valve train system for an internal combustion engine includes a cam cap for engagement to a cylinder head, cam shaft carrier, or valve cover and at least one tappet positioned within the cam cap for engagement with a corresponding cam lobe. The at least one tappet is configured for operation in a first mode and in a second mode. In the first mode the at least one tappet is configured to transfer a first valve lift in response to a cam lobe profile acting on the at least one tappet, and in the second mode the at least one tappet is configured to transfer a second valve lift in response to the cam lobe profile acting on the at least one tappet, where the second valve lift is less than the first valve lift.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An internal combustion engine system, comprising:

a cylinder housing a piston operably connected to a crankshaft, the cylinder further including at least one intake valve and at least one exhaust valve for selectively opening and closing respective ones of at least one intake opening and at least one exhaust opening of the cylinder;

a camshaft including a first cam lobe and a second cam lobe, the first and second cam lobes being rotatable with rotation of the camshaft; and a valve lifting mechanism linking the first and second cam lobes to respective ones of the at least one intake valve and the at least one exhaust valve, the valve lifting mechanism including a first tappet linking the at least one intake valve to the first cam lobe and a second tappet linking the at least one exhaust valve to the second cam lobe, the valve lifting mechanism including a single actuator that simultaneously reconfigures the first and second tappets from a first configuration in which all motion from the first and second cam lobes is imparted to the linked at least one intake valve and at least one exhaust valve, to a second configuration in which less than all motion from the first and second cam lobes is imparted to the linked at least one intake valve and at least one exhaust valve.

2. The system of claim 1, wherein the actuator includes a rack that is engaged to an outer surface of each of the first and second tappets so that rotation of the rack rotates a part of each of the first and second tappets from the first configuration to the second configuration.

3. The system of claim 1, wherein each of the first and second tappets includes an inner body housed within an outer body, and in the first configuration the inner and outer bodies are axially locked to prevent axial movement relative to one another and in the second configuration the outer body is rotated relative to the inner body so the inner and outer bodies are axially unlocked to permit axial movement relative to one another.

4. The system of claim 1, wherein the valve lifting mechanism includes:

a first rocker lever connected to the at least one intake valve, an intake cam follower contacting the first cam, and an intake push tube connecting the intake cam follower to the first tappet; and a second rocker lever connected to the at least one exhaust valve, an exhaust cam follower contacting the second cam, and an exhaust push tube connecting the exhaust cam follower to the second tappet.

5. The system of claim 4, wherein in the second configuration of the first and second tappets the intake push rod and the exhaust push rod are each allowed to translate relative to the first tappet and the second tappet, respectively, in response to the first and second cam lobes contacting the intake cam follower and the exhaust cam follower, respectively, so the at least one intake valve and the at least one exhaust valve remain closed.

6. The system of claim 4, wherein the first tappet and the second tappet each include:

an outer body including a collar engaged to the corresponding one of the first rocker lever and the second rocker lever; and an inner body engaged to the corresponding one of the intake push tube and the exhaust push tube.

7. The system of claim 6, wherein in the first configuration the inner and outer bodies of each of the first and second tappets are locked so that displacement of the intake push tube and the exhaust push tube by the first cam lobe and the second cam lobe, respectively, act on and pivot the corresponding one of the first rocker lever and the second rocker lever, and in the second configuration of the inner and outer bodies of each of the first and second tappets are unlocked so that displacement of the intake push tube and the exhaust push tube by the first cam lobe and the second cam lobe, respectively, is lost by displacement of the inner bodies within the outer bodies without acting on the corresponding one of the first rocker lever and the second rocker lever.

8. The system of claim 1, wherein the first and second tappets are housed in a rocker housing, and the actuator is mounted to the rocker housing and extends through a bore in the rocker housing to a location between the first and second tappets.

9. The system of claim 8, wherein the first and second tappets are in direct contact with respective ones of a first rocker lever assembly and a second rocker lever assembly housed in the rocker housing.

10. The system of claim 1, wherein the actuator includes a pin that is actuated to contact a radially extending arm of each of the first and second tappets so that displacement of the pin rotates a part of each of the first and second tappets from the first configuration to the second configuration.

11. The system of claim 1, wherein each of the first and second tappets includes an inner body housed within an outer body, and in the first configuration the inner and outer bodies are axially locked to prevent axial movement relative to one another and in the second configuration the inner body is rotated relative to the outer body so the inner and outer bodies are axially unlocked to permit axial movement relative to one another.

12. The system of claim 1, wherein the valve lifting mechanism includes:

a first rocker lever connected to the at least one intake valve and an intake cam follower contacting the first cam and the first tappet; and a second rocker lever connected to the at least one exhaust valve and an exhaust cam follower contacting the second cam and the second tappet.

13. A tappet for modifying a valve lift in a valve train system for an internal combustion engine, comprising:

an elongated inner body housed within an outer body, wherein the inner body and the outer body include a locked configuration in which the inner body and the outer body are axially locked relative to one another in order to provide a first valve lift in response to a cam lobe profile acting on the tappet, the inner body and the outer body being rotated axially relative to one another to an unlocked configuration in which the inner body and the outer body are axially movable relative to one another to provide a second valve lift in response to the cam lobe profile acting on the tappet, the second valve lift being less than the first valve lift.

14. The tappet of claim 13, wherein the inner body is spring-biased relative to the outer body toward the locked configuration.

15. The tappet of claim 13, wherein the outer body includes outer teeth that are engaged by an actuator to rotate the outer body relative to the inner body.

16. The tappet of claim 13, wherein the outer body includes a collar extending outwardly therefrom that is for direct contact with a rocker lever of the valve train assembly.

17. The tappet of claim 13, further comprising a shear pin engaged to the inner body and extending through the outer body, wherein in the locked configuration the shear pin is in contact with the outer body to prevent axial movement of the inner body relative to the outer body, and in the unlocked configuration the shear pin is aligned with an axially extending opening in the outer body to allow axial movement of the inner body relative to the outer body.

18. A valve train system for an internal combustion engine, comprising:

a rocker housing, at least one tappet positioned within the rocker housing, and a rocker lever in the rocker housing positioned around and in direct contact with the at least one tappet to pivot the rocker lever in response to a valve lift, the at least one tappet being configured for operation in a first mode and in a second mode, wherein in the first mode the at least one tappet is configured to transfer a first valve lift in response to a cam lobe profile acting on the at least one tappet, and in the second mode the at least one tappet is configured to transfer a second valve lift in response to the cam lobe profile acting on the at least one tappet, the second valve lift being less than the first valve lift.

19. The valve train system of claim 18, wherein the at least one tappet includes:

an elongated inner body housed within an outer body, wherein in the first mode the inner body and the outer body are axially constrained relative to one another, and in the second mode the inner body and the outer body are rotated axially relative to one another so the inner body and the outer body are axially movable relative to one another; and further comprising an actuator mounted to the rocker housing that is engaged to the at least one tappet to axially rotate the inner body and the outer body relative to one another.

* * * * *